(12) United States Patent
Hillerich, Jr. et al.

(10) Patent No.: US 10,994,309 B2
(45) Date of Patent: *May 4, 2021

(54) SYSTEM AND METHOD FOR IDENTIFYING AND TRANSFERRING PARCELS FROM A FIRST CONVEYOR TO A SECOND CONVEYOR

(71) Applicant: Material Handling Systems, Inc., Mount Washington, KY (US)

(72) Inventors: Thomas Anthony Hillerich, Jr., Louisville, KY (US); Michael Alan McCue, Louisville, KY (US); Gregory Robert Sturm, Simpsonville, KY (US); David W. Caldwell, II, Louisville, KY (US); Derek Robert Sturm, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,113

(22) Filed: Mar. 24, 2020

(65) Prior Publication Data
US 2020/0222945 A1 Jul. 16, 2020

Related U.S. Application Data

(63) Continuation of application No. 16/001,010, filed on Jun. 6, 2018, now Pat. No. 10,646,898.
(Continued)

(51) Int. Cl.
*B07C 5/342* (2006.01)
*B07C 5/36* (2006.01)
*B07C 3/02* (2006.01)

(52) U.S. Cl.
CPC .............. *B07C 5/3422* (2013.01); *B07C 3/02* (2013.01); *B07C 5/36* (2013.01); *B07C 5/362* (2013.01)

(58) Field of Classification Search
CPC ......... B07C 5/34; B07C 5/3412; B07C 5/342; B07C 5/3422; B07C 5/36; B07C 5/362; B07C 3/02
(Continued)

(56) References Cited

U.S. PATENT DOCUMENTS

| 6,081,981 A * | 7/2000 | Demarest ......... A61B 17/06004 |
| | | 29/407.04 |
| 10,646,898 B2 * | 5/2020 | Hillerich, Jr. ............. B07C 3/02 |

(Continued)

FOREIGN PATENT DOCUMENTS

EP 3634890 A1 * 4/2020 ............... B07C 5/36

*Primary Examiner* — Terrell H Matthews
(74) *Attorney, Agent, or Firm* — Stites & Harbison, PLLC; David W. Nagle, Jr.; Gary N. Stewart

(57) ABSTRACT

A system for identifying and transferring parcels includes a robot singulator configured to engage and transfer individual parcels in a bulk flow of multiple parcels on a first conveyor to a singulated stream of parcels on a second conveyor. The system further includes a vision and control subsystem, with a first camera for acquiring image data of the bulk flow of multiple parcels, and a computer that receives and processes the image data to identify and segment individual parcels, and then communicates instructions to the robot singulator to engage and transfer each of the individual parcels to the second conveyor. The system may further include a second camera for acquiring image data of the individual parcels to confirm placement on the second conveyor. The system may further include first and second indexing conveyors controlled by the vision and control subsystem for delivering parcels to the robot singulator.

17 Claims, 22 Drawing Sheets

Related U.S. Application Data

(60) Provisional application No. 62/515,909, filed on Jun. 6, 2017, provisional application No. 62/616,469, filed on Jan. 12, 2018.

(58) Field of Classification Search
 USPC .......................................................... 209/577
 See application file for complete search history.

(56) References Cited

U.S. PATENT DOCUMENTS

| | | | |
|---|---|---|---|
| 10,793,375 B2* | 10/2020 | Wagner | G05B 19/4189 |
| 2009/0159404 A1* | 6/2009 | Schroader | B65G 21/209 |
| | | | 198/535 |
| 2013/0283732 A1* | 10/2013 | Potter | B65B 25/064 |
| | | | 53/411 |
| 2014/0332344 A1* | 11/2014 | Jodoin | B65G 47/31 |
| | | | 198/448 |
| 2015/0209831 A1* | 7/2015 | Wargo | B07C 3/20 |
| | | | 209/539 |

* cited by examiner

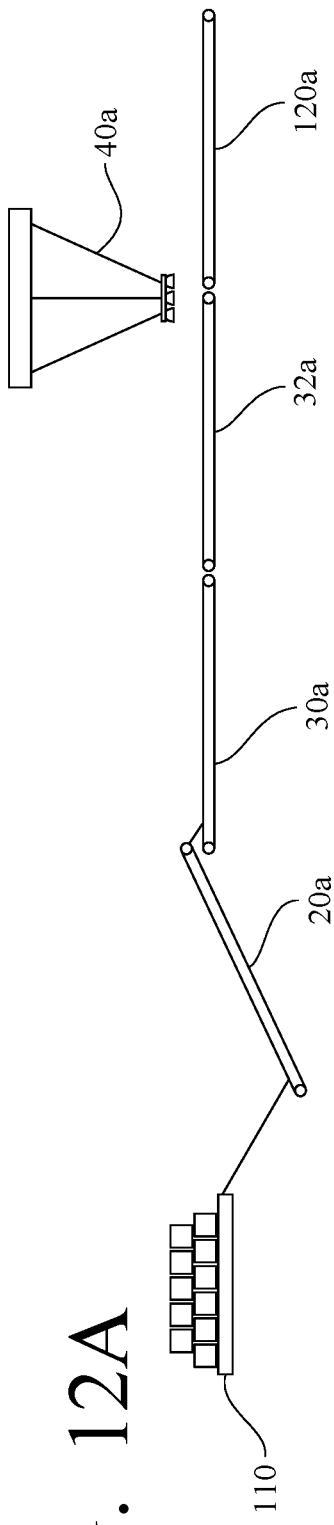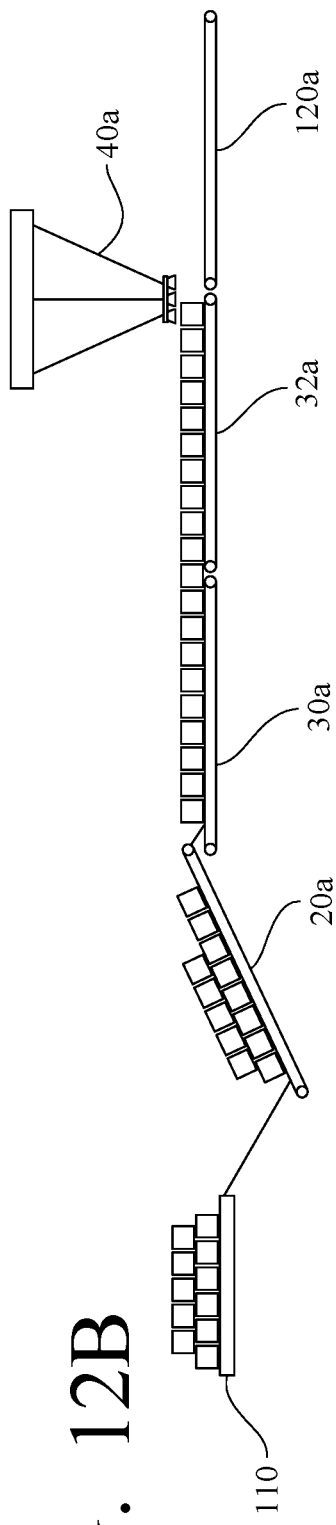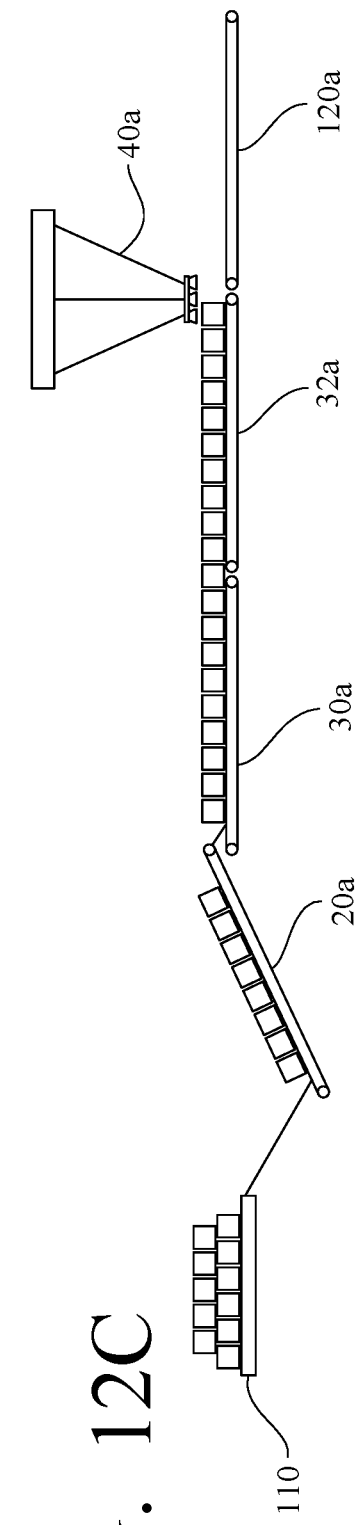

SYSTEM AND METHOD FOR IDENTIFYING AND TRANSFERRING PARCELS FROM A FIRST CONVEYOR TO A SECOND CONVEYOR

CROSS-REFERENCE TO RELATED APPLICATIONS

The present application is a continuation of U.S. patent application Ser. No. 16/001,010 filed on Jun. 6, 2018, which claims priority to U.S. Patent Application Ser. No. 62/515,909 filed on Jun. 6, 2017 and U.S. Patent Application Ser. No. 62/616,469 filed on Jan. 12, 2018, the entire disclosures of which are incorporated herein by reference.

BACKGROUND OF THE INVENTION

The present invention relates to the handling of parcels within a sorting or similar facility.

In a sorting facility for parcels, parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators exist in the art, many of which employ various combinations of belt conveyors and/or roller conveyors to achieve the desired singulation of the parcels. However, there are certain deficiencies in such prior art systems. For example, a surge in the volume of parcels may overwhelm the mechanical systems, and parcels may not be fully singulated. Non-singulated parcels may then interfere with subsequent processing, including downstream sorting.

Accordingly, there remains a need for systems and methods for identifying and transferring parcels from a bulk flow into a singulated stream of parcels, which is subsequently delivered to a sorter.

SUMMARY OF THE INVENTION

The present invention is a system and method for identifying and transferring parcels from a first conveyor to a second conveyor, and, more particularly, a system and method for identifying and transferring parcels from a bulk flow on the first conveyor to a singulated stream of parcels on the second conveyor, which is subsequently delivered to a sorter.

In one exemplary configuration, a bulk flow of parcels is being transported on a bulk conveyor. The parcels are positioned randomly on the bulk conveyor. The parcels are then delivered to a bulk flow splitting conveyor, which divides and delivers parcels to multiple separate and substantially identical singulation stations (or lanes).

A robot singulator (or robot) receives parcels at each singulation station, engages each parcel, and then places it onto an induction conveyor for delivery to a sorter. The robot singulator thus includes an end effector with a means for engaging the selected parcel. For example, the end effector may include one or more vacuum cups for engaging the selected parcel. The end effector is mounted on a framework, which is controlled to move and position the end effector. The framework preferably has six degrees of freedom: (i) movement along the x-axis; (ii) movement along the y-axis; (iii) movement along the z-axis; (iv) rotation about the x-axis; (v) rotation about the y-axis; and (vi) rotation about the z-axis. Thus, the framework can always be positioned for the end effector to engage a selected parcel.

To position the framework and the end effector to engage the selected parcel, the system also includes a vision and control subsystem associated with the robot. The vison and control subsystem has two primary functions, which can be independently activated: (i) Target function, and (ii) Confirm function. The vision and control subsystem thus includes a first (or Target) camera, which is preferably positioned adjacent the robot and is focused on the "grab" position where a selected parcel is to be engaged by the end effector of the robot. The vision and control subsystem also includes a second (or Confirm) camera, which is preferably positioned adjacent the induction conveyor to confirm placement of the selected parcel by the robot.

The cameras are operably connected to a computer, which receives and processes the image data. In this regard, the computer includes a processor for executing instructions (routines) stored in a memory component or other computer-readable medium.

Image data from the first (or Target) camera is used to generate a three-dimensional representation of the parcels. Parcels are then identified and segmented from the three-dimensional representation. Once a complete segmentation map of the parcels has been generated, the segmentation map is examined to identify parcels and their surface properties, and then to rank parcels for acquisition. Once the parcels have been identified and ranked, the computer communicates instructions to position the robot such that the end effector can engage and manipulate each parcel according to the ranked order.

Image data from the second (or Confirm) camera 404 is then used to generate a three-dimensional representation of the parcels during and after placement. Parcels are then identified and segmented from the three-dimensional representation. Once a parcel has been identified, its position on the induction conveyor can be compared to the target position for placement of the parcel to confirm proper placement.

In some embodiments, each singulation station also includes an unstacking conveyor. As parcels are delivered to the singulation station, they slide onto the unstacking conveyor, which has an upward incline, such that the force of gravity causes parcels to unstack. The vison and control subsystem preferably also controls movement of the unstacking conveyor.

In some embodiments, the singulation station also includes a first indexing conveyor and a second indexing conveyor. Each parcel from the unstacking conveyor is delivered to the first indexing conveyor, which selectively advances the parcels to the second indexing conveyor. The second indexing conveyor provides a continuous flow of parcels to the robot singulator. The vison and control subsystem preferably also controls movement of the first indexing conveyor and the second indexing conveyor.

DESCRIPTION OF THE DRAWINGS

FIG. 12A-M are schematic views that illustrate movement of the parcels along the conveyors of the singulation station of FIG. 3.

DETAILED DESCRIPTION OF THE INVENTION

The present invention is a system and method for identifying and transferring parcels from a first conveyor to a second conveyor, and, more particularly, a system and method for identifying and transferring parcels from a bulk flow on the first conveyor to a singulated stream of parcels on the second conveyor, which is subsequently delivered to a sorter.

Figure 1:
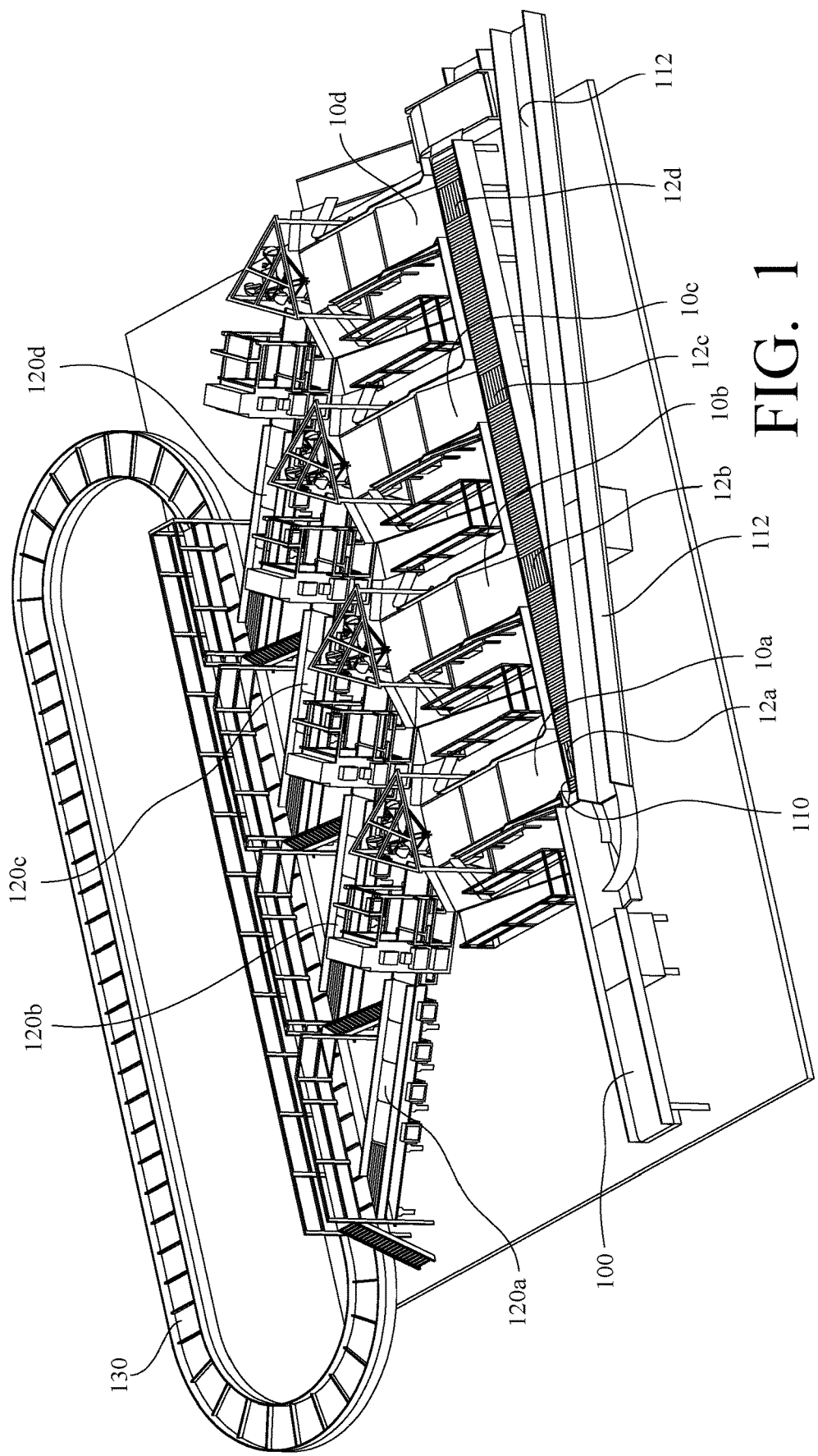
FIG. 1 is a view of an exemplary configuration of a conveyor system in which a bulk flow of parcels is delivered to multiple singulation stations (or lanes), where each parcel in the bulk flow is identified and then transferred onto an induction conveyor for delivery to a sorter according to the system and method of the present invention.

Referring now to FIG. 1, in one exemplary configuration, a bulk flow of parcels (not shown) is being transported on a bulk conveyor 100. The parcels (not shown in FIG. 1) are positioned randomly on the bulk conveyor 100. The parcels are then delivered to a bulk flow splitting conveyor (or volume distribution conveyor) 110. In this exemplary configuration, and as shown in FIG. 1, the bulk flow splitting conveyor 110 divides and delivers parcels to four separate and substantially identical singulation stations (or lanes) 10a, 10b, 10c, 10d, the operation of which will be discussed below. Specifically, in this exemplary configuration, there is a series of powered rollers 12a, 12b, 12c, 12d at each of the four singulation stations 10a, 10b, 10c, 10d that are selectively activated to move parcels off of the bulk flow splitting conveyor 110. However, there are many other bulk flow splitters known in the art, including, for example, activated roller belts, activated plow over conveyors, and tilting conveyors, which could be similarly used without departing from the spirit and scope of the present invention.

Referring still to FIG. 1, in this exemplary configuration, there is also a recirculation subsystem. If any of the parcels are not fed into one of the singulation stations 10a, 10b, 10c, 10d, those parcels are returned to the bulk conveyor 100 via a conveyor belt 112 positioned at the end of the bulk flow splitting conveyor 110.

FIGS. 2A-2I are schematic views that illustrate the splitting of the bulk flow of parcels and the delivery of the parcels to the singulation stations 10a, 10b, 10c, 10d.

Figure 2A:
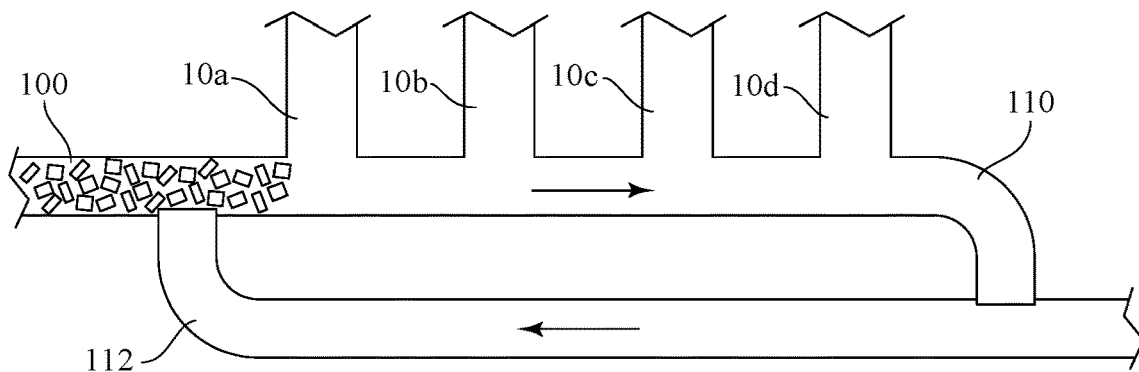
FIGS. 2A-2I are schematic views that illustrate the splitting of the bulk flow of parcels and the delivery of the parcels to the singulation stations of FIG. 1.
Figure 2B:
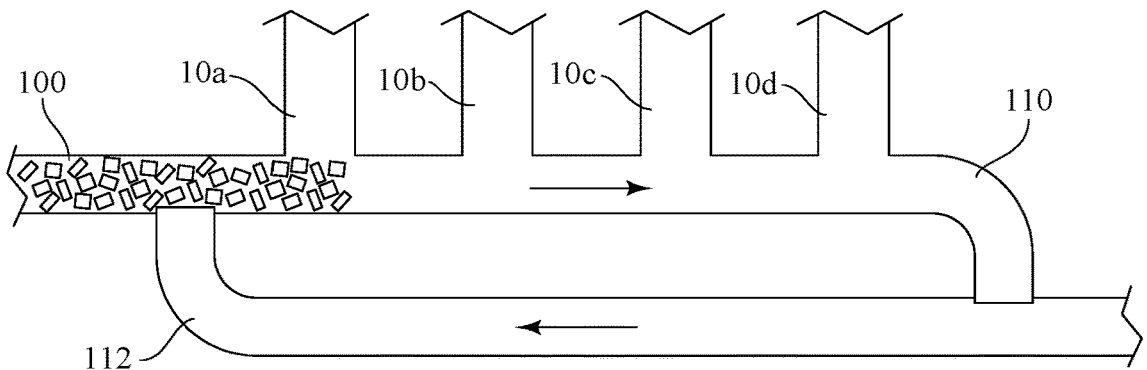

In FIGS. 2A and 2B, parcels are being conveyed on the bulk flow splitting conveyor 110, which is moving at a predetermined continuous speed.

Figure 2C:
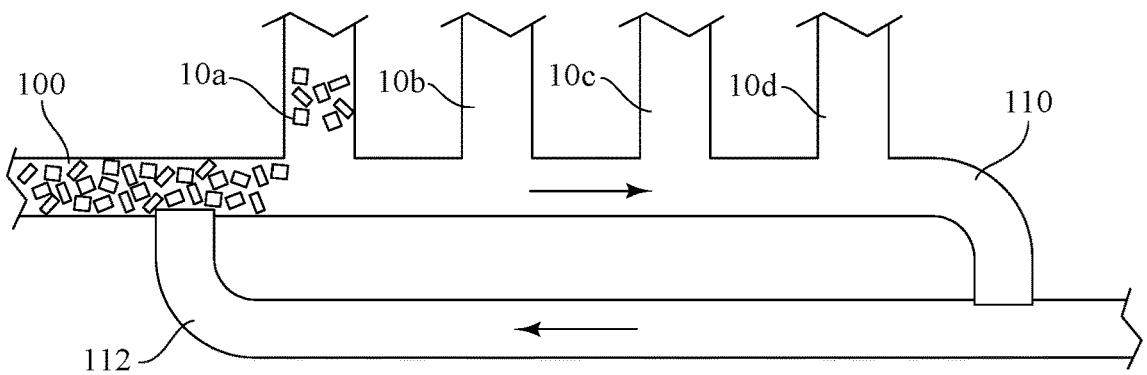

In FIG. 2C, as a result of the activation of a series of powered rollers or other known bulk splitting techniques, parcels are moved off of the bulk flow splitting conveyor 110 and delivered to a first singulation station (or lane) 10a.

Figure 2D:
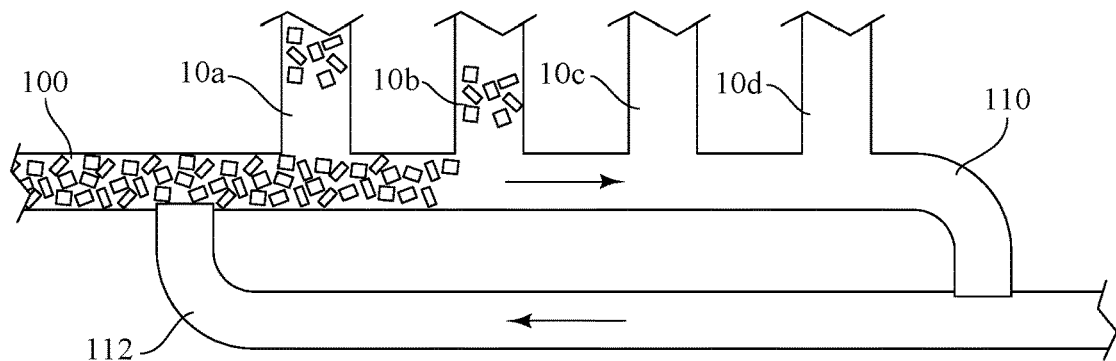

In FIG. 2D, delivery of the parcels from the bulk flow splitting conveyor 110 to the first singulation station 10a has been discontinued. Now, as a result of the activation of another series of powered rollers or other known bulk splitting techniques, parcels are moved off of the bulk flow splitting conveyor 110 and delivered to a second singulation station (or lane) 10b.

Figure 2E:
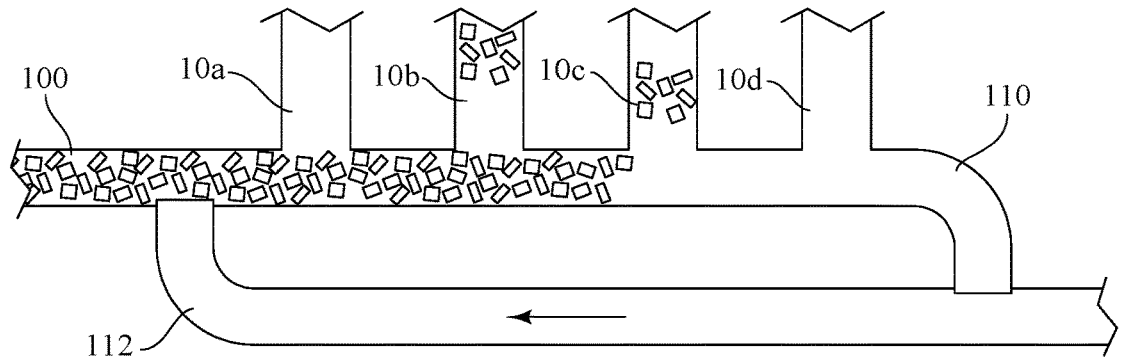

In FIG. 2E, delivery of the parcels from the bulk flow splitting conveyor 110 to the first singulation station 10a and the second singulation station 10b has been discontinued. Now, as a result of the activation of another series of powered rollers or other known bulk splitting techniques, parcels are moved off of the bulk flow splitting conveyor 110 and delivered to a third singulation station (or lane) 10c.

Figure 2F:
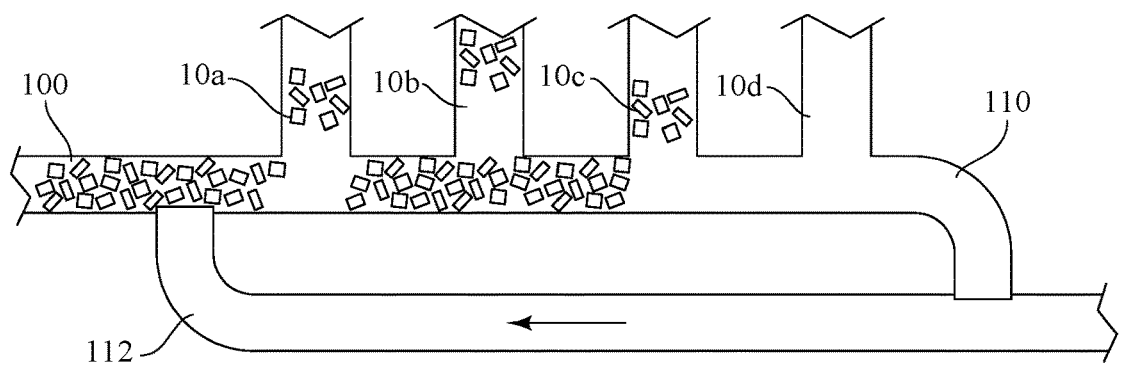

In FIG. 2F, the parcels that were previously delivered to the first singulation station 10a have been processed, and another volume of parcels is moved off of the bulk flow splitting conveyor 110 and delivered to the first singulation station 10a.

Figure 2G:
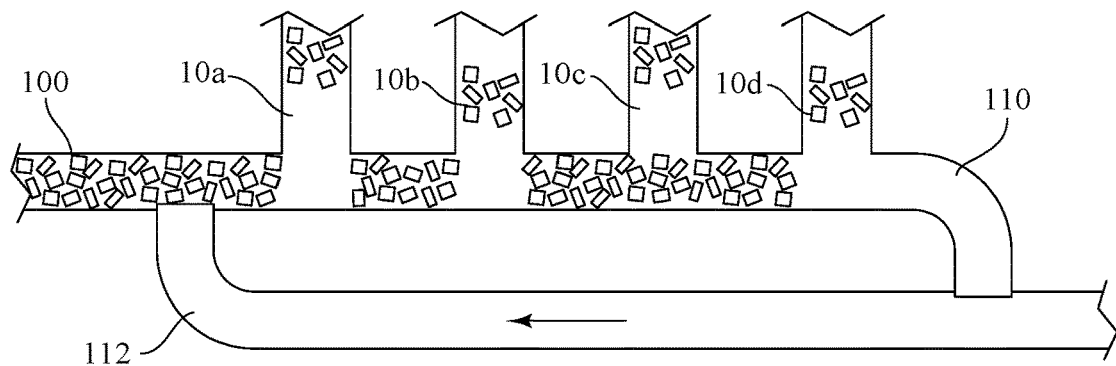

In FIG. 2G, the parcels that were previously delivered to the second singulation station 10b have been processed, and another volume of parcels is moved off of the bulk flow splitting conveyor 110 and fed to the second singulation station 10b. At the same time, as a result of the activation of another series of powered rollers or other known bulk splitting techniques, parcels are also moved off of the bulk flow splitting conveyor 110 and delivered to a fourth singulation station (or lane) 10d.

Figure 2H:
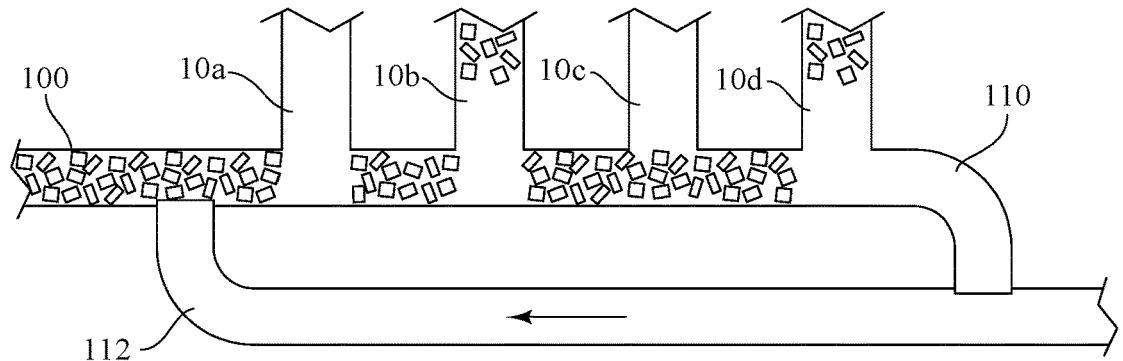

In FIG. 2H, the parcels that were previously delivered to the first singulation station 10a and the third singulation station 10c have been processed, and the parcels delivered to the second singulation station 10b and the fourth singulation station 10d are being processed.

Figure 2I:
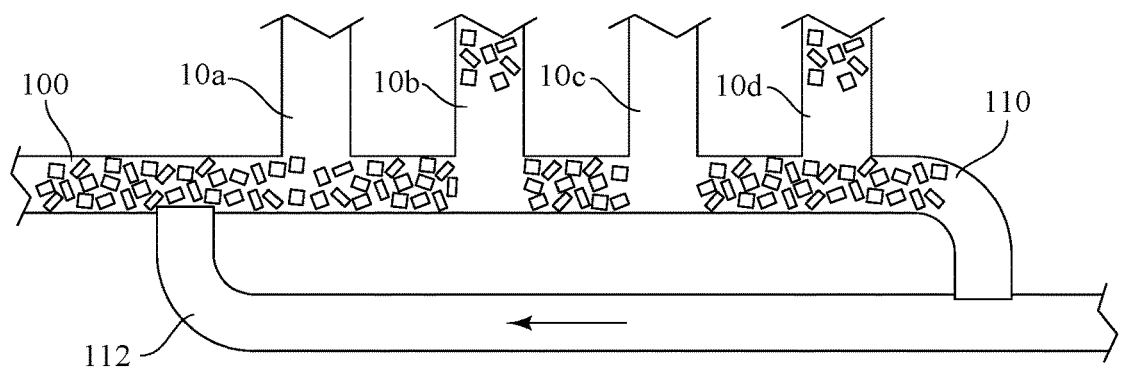

In FIG. 2I, while the parcels delivered to the second singulation station 10b and the fourth singulation station 10d are being processed, additional volumes of parcels are moved off of the bulk flow splitting conveyor 110 and delivered to the first singulation station 10a and third singulation station 10c. Furthermore, as shown in FIG. 2I, any parcels that passed all four singulation stations 10a-d enter the above-described recirculation subsystem.

Figure 3:
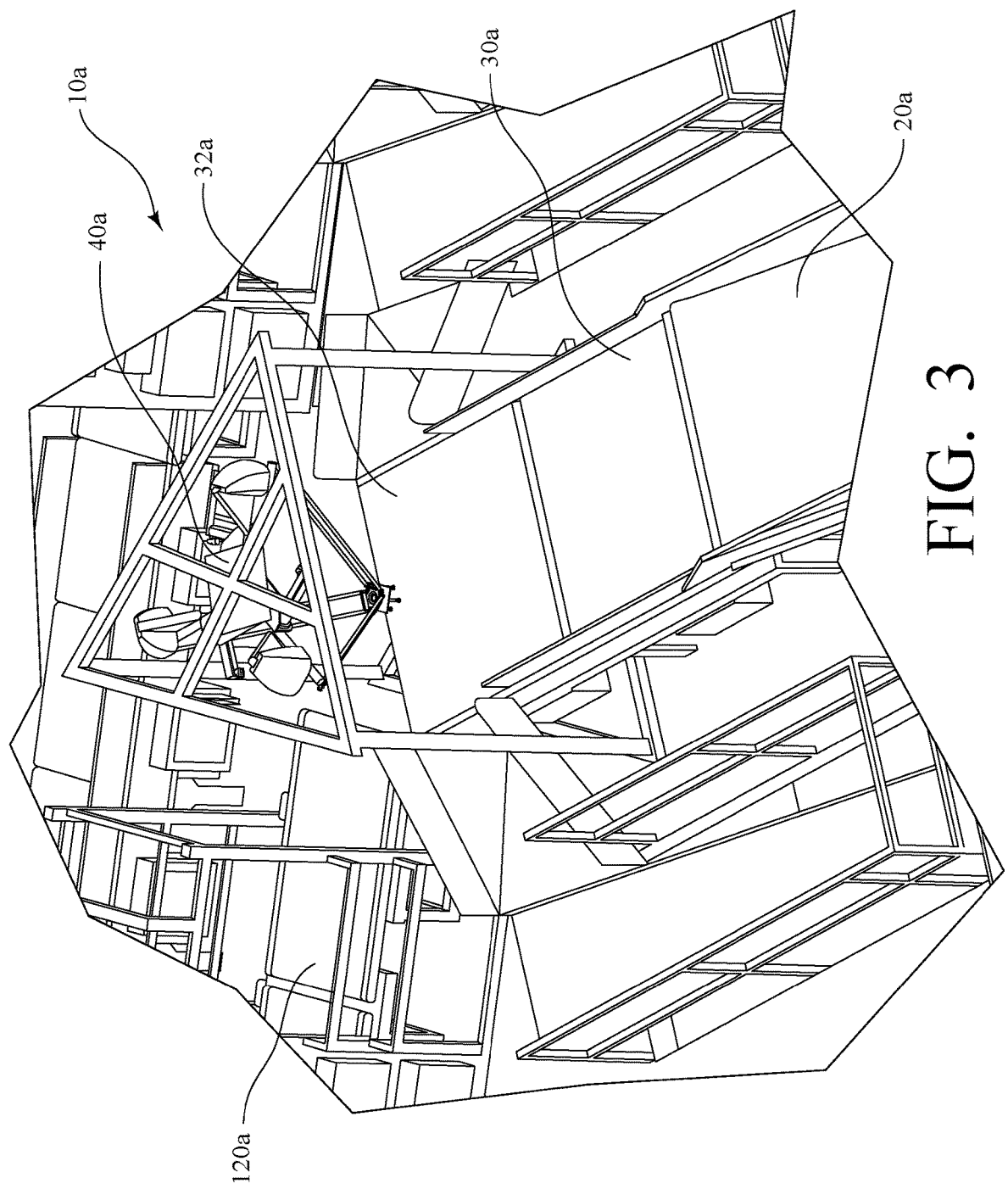
FIG. 3 is an enlarged perspective view of one of the singulation stations of FIG. 1.

FIG. 3 is an enlarged perspective view of one of the singulation stations 10a. As shown in FIG. 3, and as further described below, an exemplary system made in accordance with the present invention includes a robot singulator (or robot) 40*a* that receives parcels at the singulation station 10*a*, engages each parcel, and then places it onto an induction conveyor 120*a*, resulting in a singulated stream of parcels on the induction conveyor 120, which can then be delivered to a sorter 130 (as shown in FIG. 1).

Figure 4:
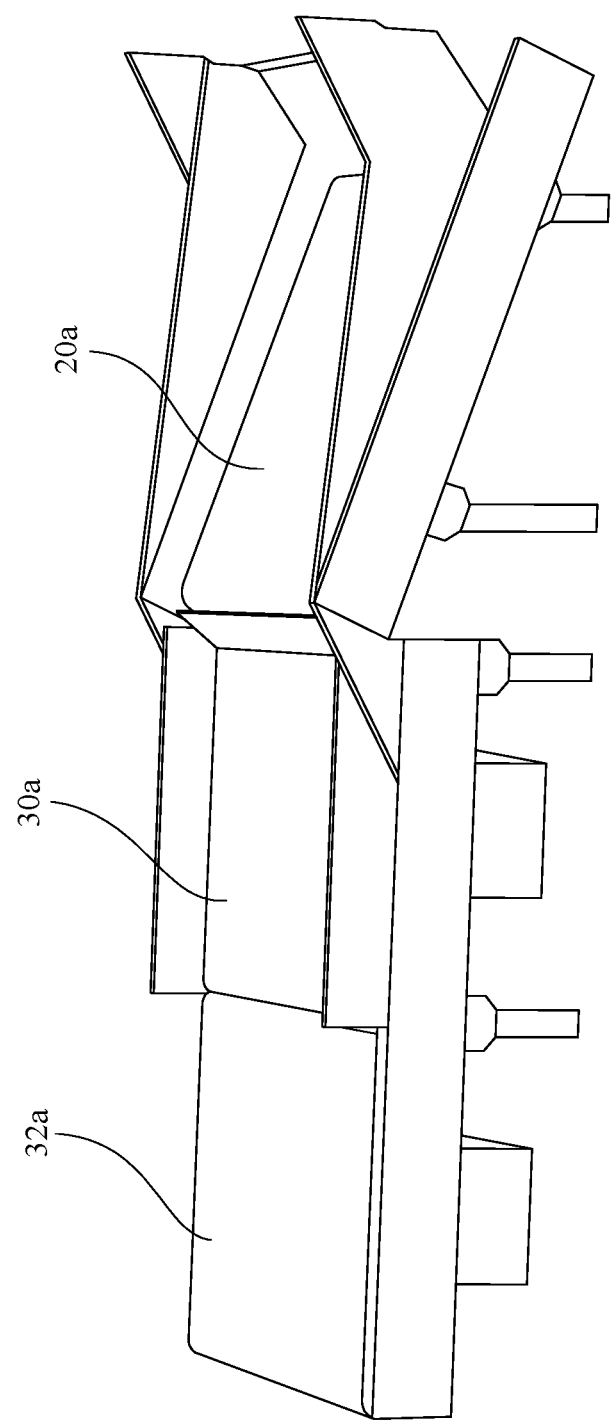
FIG. 4 is a perspective view of certain components of the singulation station of FIG. 3 in isolation.
Figure 5A:
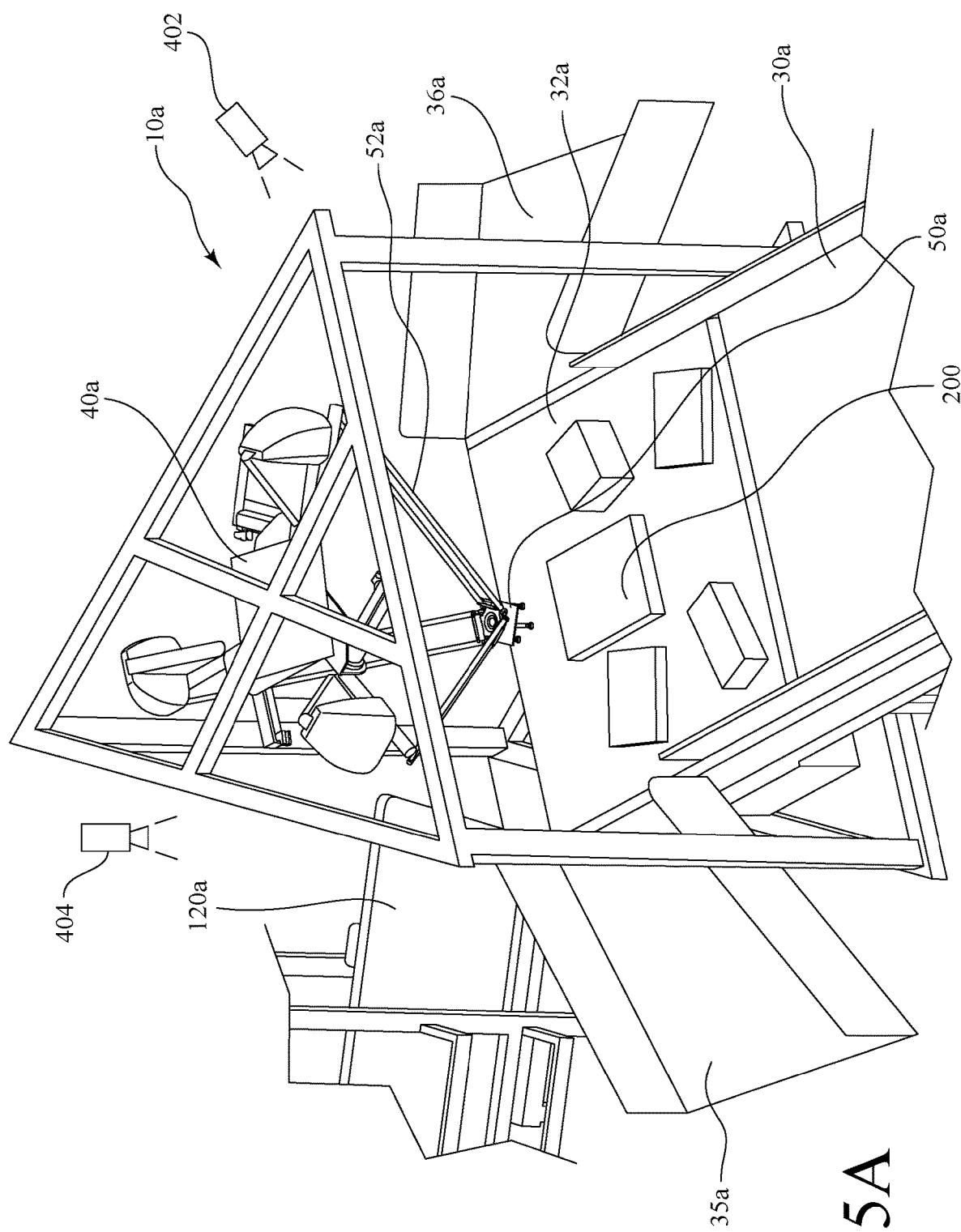
FIG. 5A is a partial perspective view of the singulation station of FIG. 3.
Figure 5B:
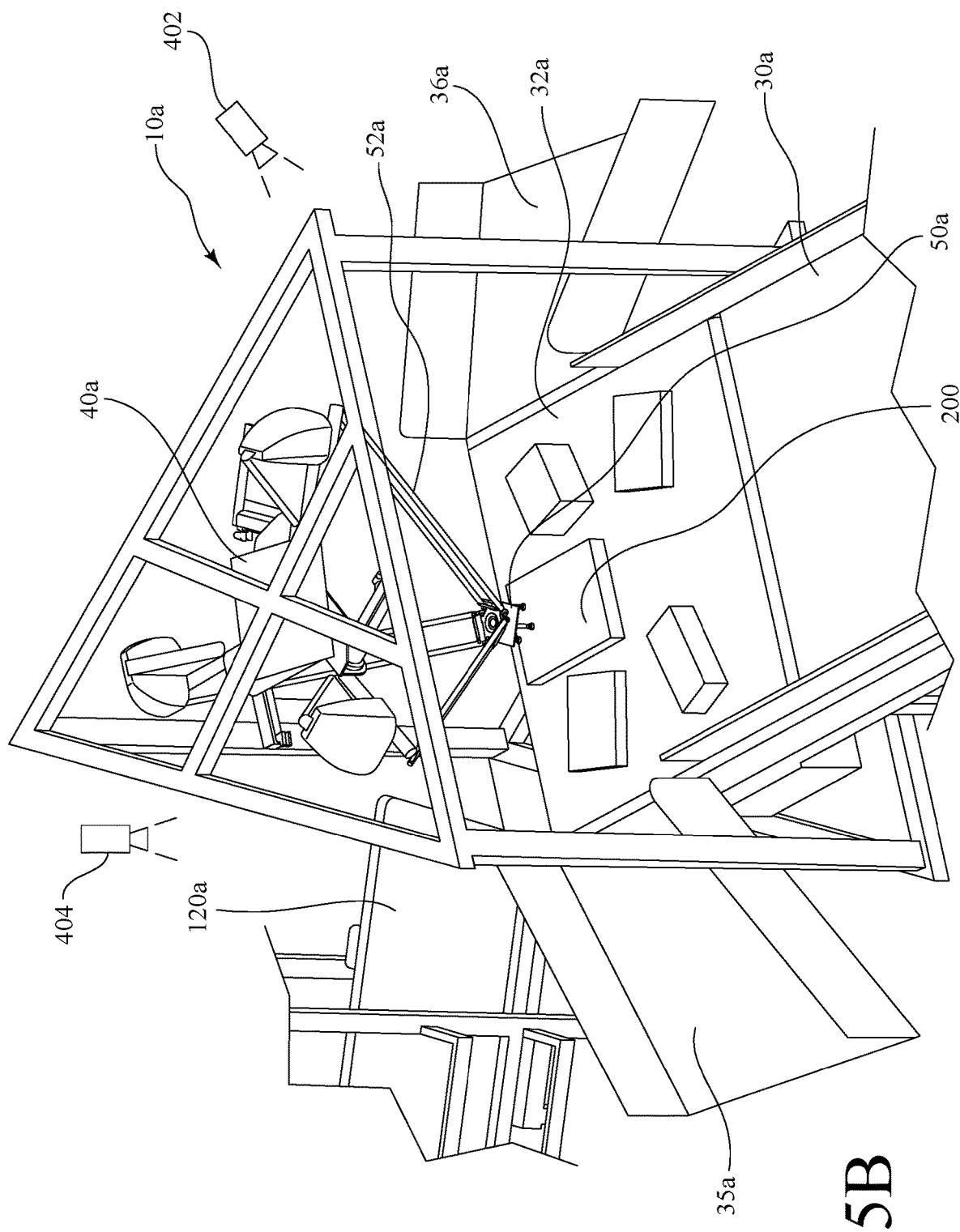
FIG. 5B is a partial perspective view similar to FIG. 5A, illustrating the identification and transfer of a selected parcel.
Figure 5C:
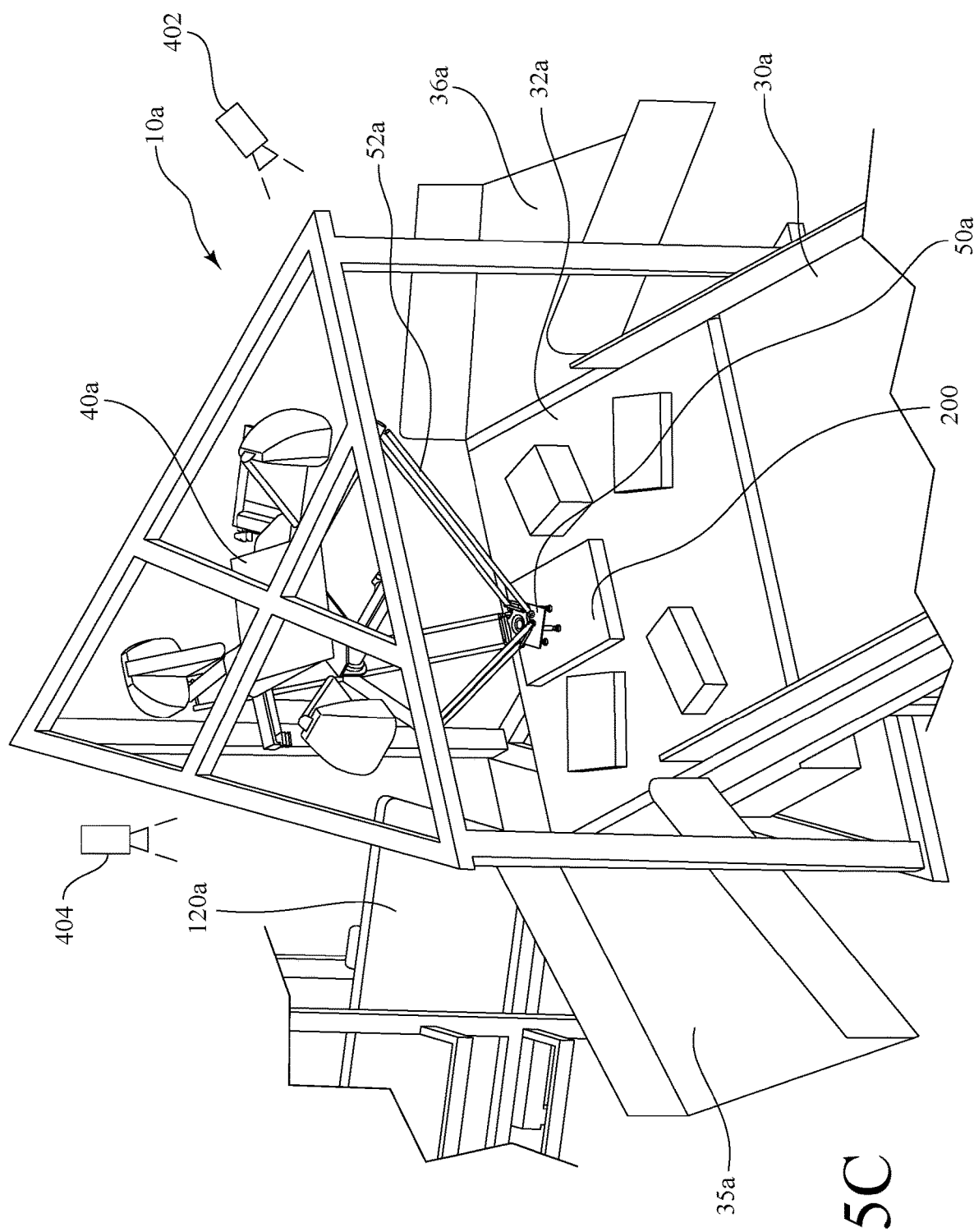
FIG. 5C is a partial perspective view similar to FIGS. 5A-5B, illustrating the identification and transfer of a selected parcel.
Figure 5D:
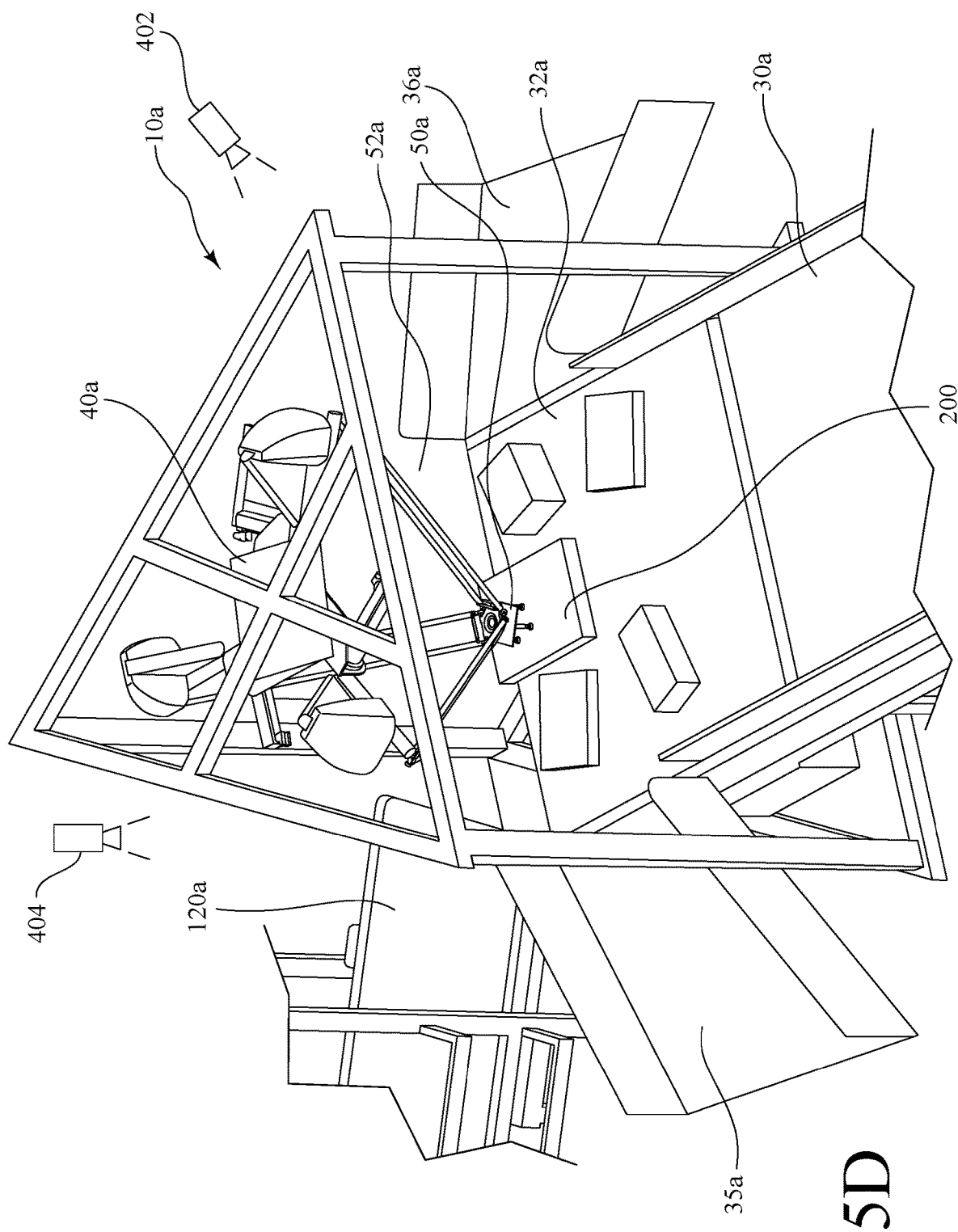
FIG. 5D is a partial perspective view similar to FIGS. 5A-5C, illustrating the identification and transfer of a selected parcel.
Figure 5E:
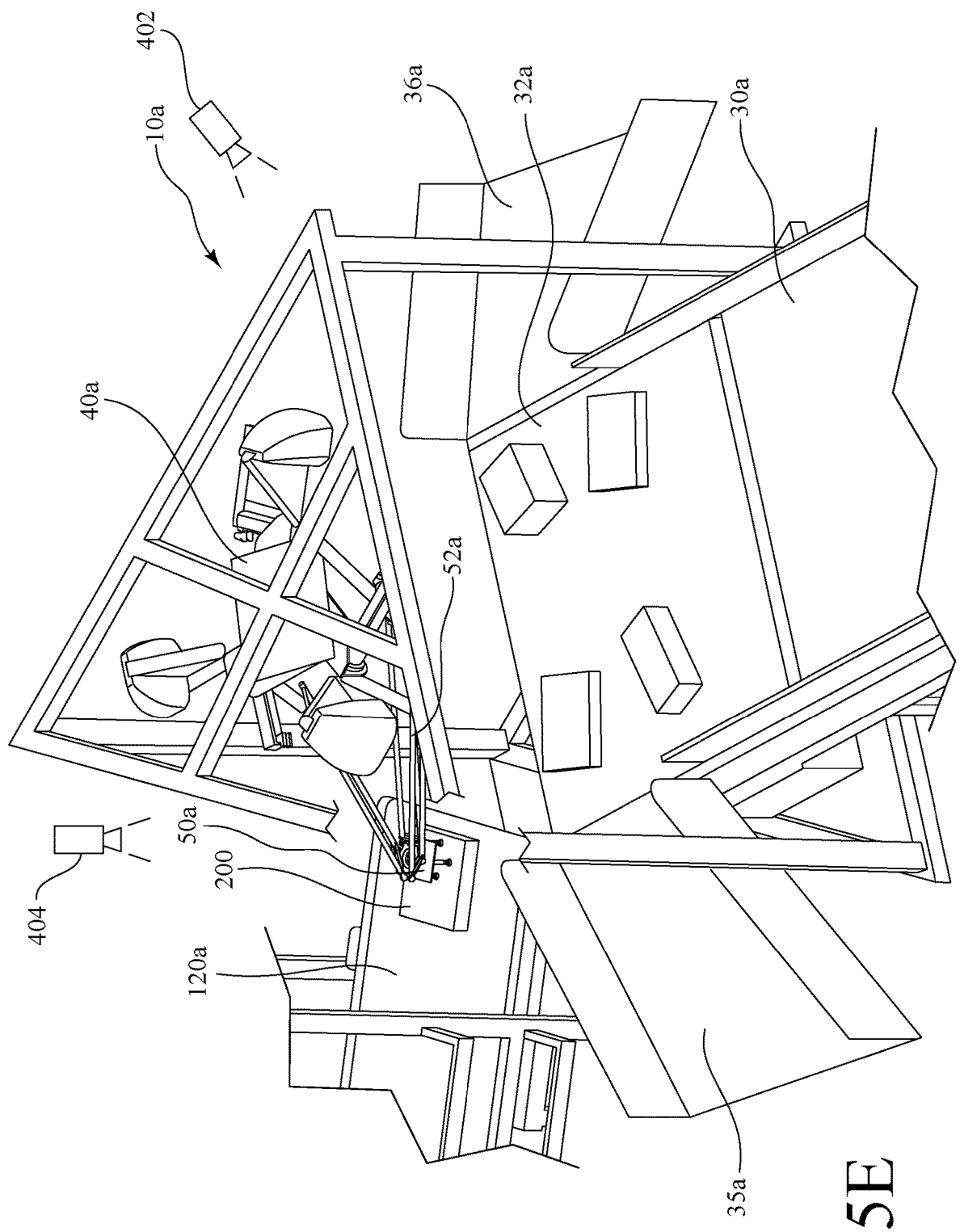
FIG. 5E is a partial perspective view similar to FIGS. 5A-5D, illustrating the identification and transfer of a selected parcel.

FIG. 4 is a perspective view of certain components of the singulation station 10*a* in isolation. In this exemplary embodiment, and as shown in FIGS. 3 and 4, the first component of the singulation station 10*a* is an unstacking conveyor 20*a*. As parcels are moved off of the bulk flow splitting conveyor 110, they slide onto the unstacking conveyor 20*a*, which has an upward incline, such that the force of gravity causes parcels to unstack. Specifically, for a parcel (i.e., an upper parcel) that is positioned on top of another parcel (i.e., a lower parcel), the force of gravity acting on the upper parcel will ordinarily be sufficient to overcome the frictional force between the upper parcel and the lower parcel, thus causing the upper parcel to tumble backwards off of the lower parcel and onto the unstacking conveyor 20*a*. Furthermore, and as will be further described below, the movement of the unstacking conveyor 20*a* is also controlled by a vision and control subsystem 400 to provide a continuous flow of parcels to a robot singulator 40*a*.

Referring still to FIGS. 3 and 4, in this exemplary embodiment, the singulation station 10*a* also includes a first indexing conveyor 30*a* and a second indexing conveyor 32*a*. Each parcel from the unstacking conveyor 20*a* is delivered to the first indexing conveyor 30*a*. As will be further described below, the movement of the first indexing conveyor 30*a* is controlled by the vision and control subsystem 400, and the first indexing conveyor 30*a* selectively advances the parcels to the second indexing conveyor 32*a*. As will be further described below, the movement of the second indexing conveyor 32*a* is also is controlled by the vision and control subsystem 400 to provide a continuous flow of parcels to the robot singulator 40*a*.

Figure 6:
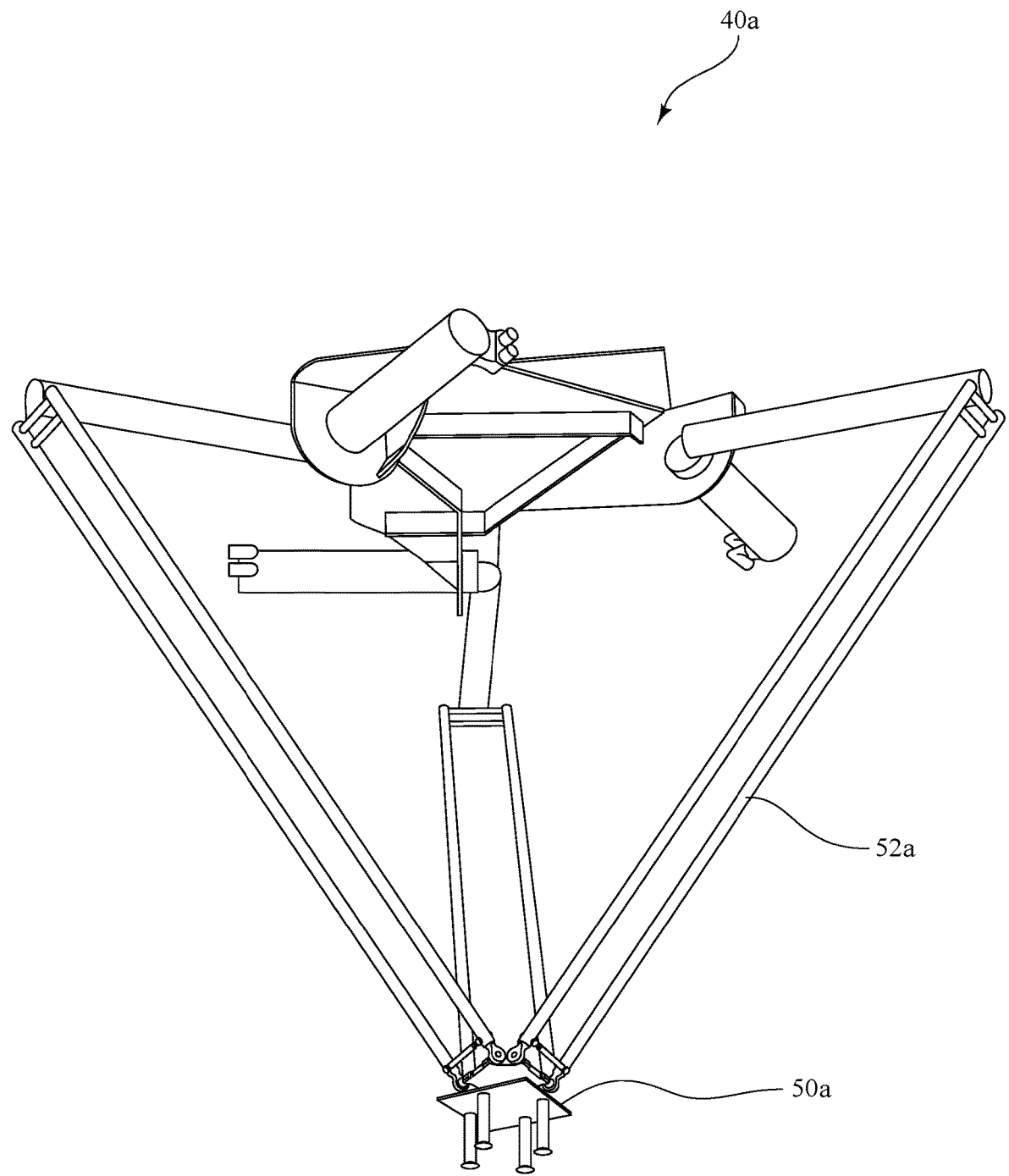
FIG. 6 is a perspective view of the robot singulator in isolation.

FIGS. 5A-5E are partial perspective views of the singulation station 10*a*, and FIG. 6 is a perspective view of the robot singulator 40*a* in isolation. As shown in FIG. 5A-5E, while on the second indexing conveyor 32*a*, a selected parcel 200 is engaged by the robot singulator 40*a*. In this regard, the robot singulator 40*a* includes an end effector 50*a* with a means for engaging the selected parcel 200. In this exemplary embodiment, and as best shown in FIG. 6, the end effector 50*a* includes one or more vacuum cups for engaging the selected parcel 200; however, other forms of end effectors (for example, actuated grippers, electrostatic adhesion means, and pushing/sweeping implements) could also be incorporated into the robot singulator 40*a*.

Referring still to FIGS. 5A-5E and 6, the end effector 50*a* is mounted on a framework 52*a*, which is controlled to move and position the end effector 50*a*. Specifically, in this exemplary embodiment, the framework 52*a* has six degrees of freedom: (i) movement along the x-axis; (ii) movement along the y-axis; (iii) movement along the z-axis; (iv) rotation about the x-axis; (v) rotation about the y-axis; and (vi) rotation about the z-axis. Thus, the framework 52*a* can always be positioned for the end effector 50*a* to engage a selected parcel. To position the framework 52*a* and the end effector 50*a* to engage the selected parcel 200, the exemplary system also includes a vision and control subsystem 400 associated with the robot singulator 40*a*.

For example, one suitable robot for use in the present invention is a Delta 3 P6 robot manufactured by Schneider Electric and available, for instance, from Advantage Industrial Automation of Duluth, Ga.

Figure 7:
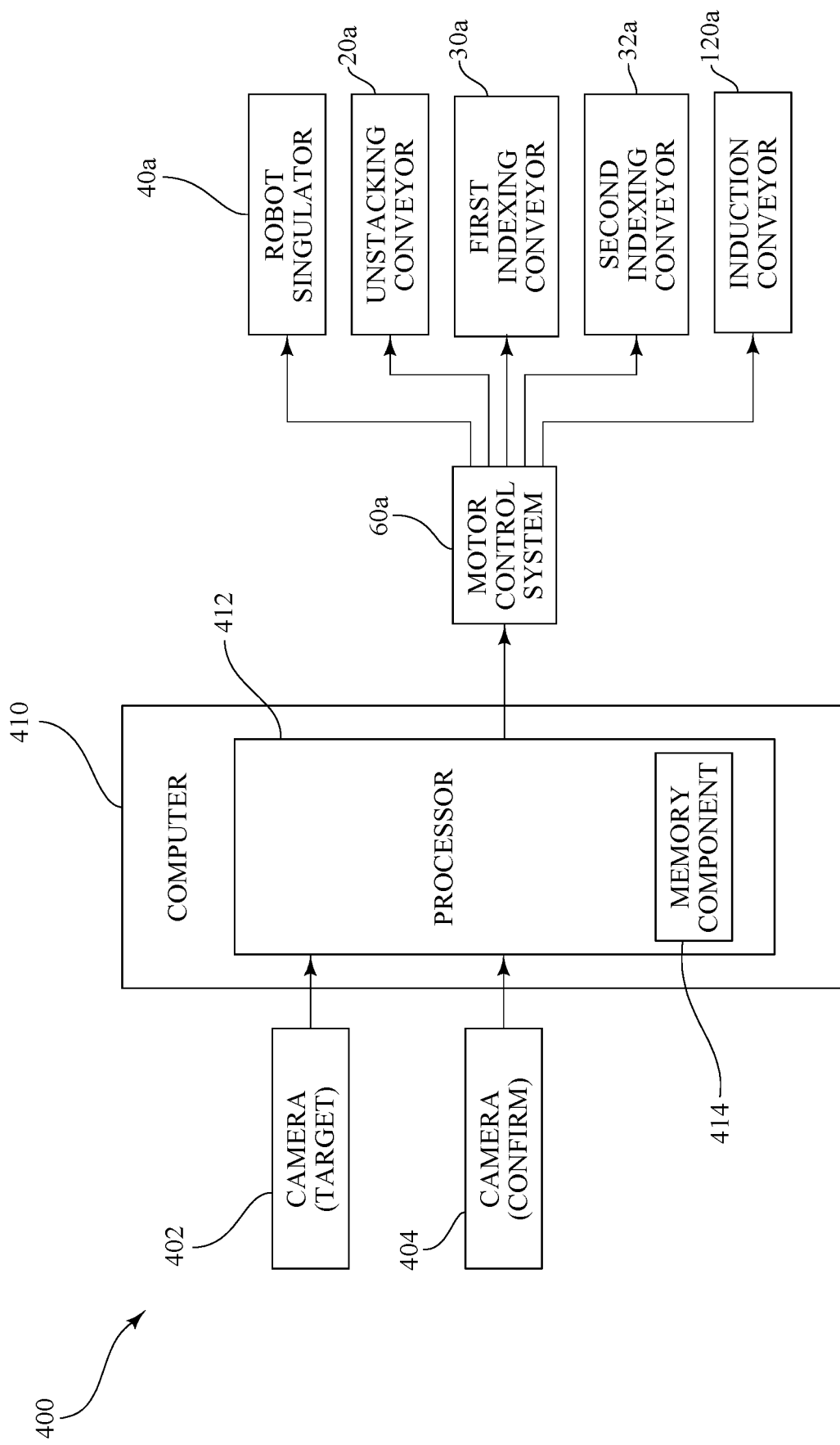
FIG. 7 is a schematic diagram of the vison and control subsystem for the singulation station of FIG. 1 according to the system and method of the present invention.

Referring now to FIG. 7, the vison and control subsystem 400 has two primary functions, which can be independently activated: (i) Target function, and (ii) Confirm function. The vision and control subsystem 400 thus includes a first (or Target) camera 402, which is preferably positioned adjacent the robot 40*a* and is focused on the "grab" position where a selected parcel is to be engaged by the end effector 50*a* of the robot 40*a*. The vision and control subsystem 400 also includes a second (or Confirm) camera 404, which is preferably positioned adjacent the induction conveyor 120*a* to confirm placement of the selected parcel by the robot 40*a*. For example, suitable cameras for use in the present invention include three-dimensional image sensors manufactured and distributed by ifm Efector Inc. of Malvern, Pa.

Referring still to FIG. 7, these cameras 402, 404 are operably connected to a computer 410, which receives and processes the image data. In this regard, the computer 410 includes a processor 412 for executing instructions (routines) stored in a memory component 414 or other computer-readable medium. With respect to such processing of the image data, the computer 410 receives the image data from the cameras 402, 404. The computer 410 will then parse, analyze, and process the image data as illustrated in the flow charts of FIGS. 8-11.

Figure 8:
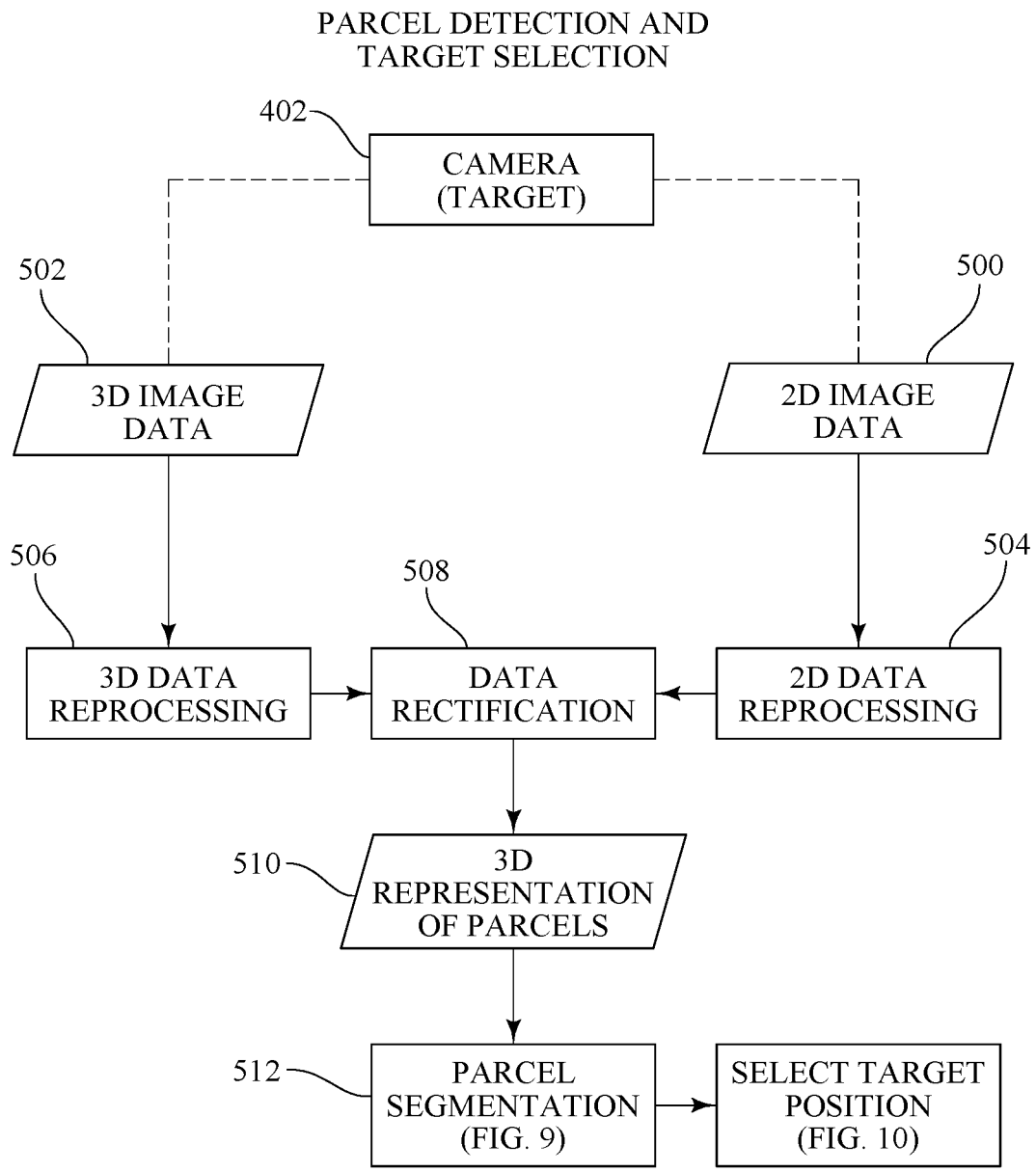
FIG. 8 is an exemplary flow chart for a "Parcel Detection and Target Selection" routine according to the system and method of the present invention.

As illustrated in FIG. 8, the overall routine is characterized as a "Parcel Detection and Target Selection" routine. First, the image data from the first (or Target) camera 402 is used to generate a three-dimensional representation of the parcels. In this regard, and as shown in FIG. 8, the camera 402 may actually acquire two-dimensional image data of the parcels and three-dimensional image data (e.g., in point-cloud data format) of the parcels, as indicated by inputs 500, 502 in FIG. 8. The two-dimensional image data and the three-dimensional image data are then subjected to a pre-processing step in order, if necessary, to correct or modify raw data received from the camera 402, as indicated by blocks 504, 506 in FIG. 8. Additionally, if both two-dimensional data and three-dimensional data are acquired by the camera 402, there is an additional step of data rectification, in which the two-dimensional data and three-dimensional data are indexed or transformed to a common coordinate system, as indicated by block 508 in FIG. 8. The final result is a three-dimensional representation of the parcels, as indicated by output 510 in FIG. 8.

Referring still to FIG. 8, parcels are then identified and segmented from the three-dimensional representation, as indicated by block 512. In this regard, it is contemplated that various image analysis techniques, machine learning techniques, and/or artificial intelligence techniques could be used to carry out the identification and segmentation of parcels from the three-dimensional representation.

Figure 9:
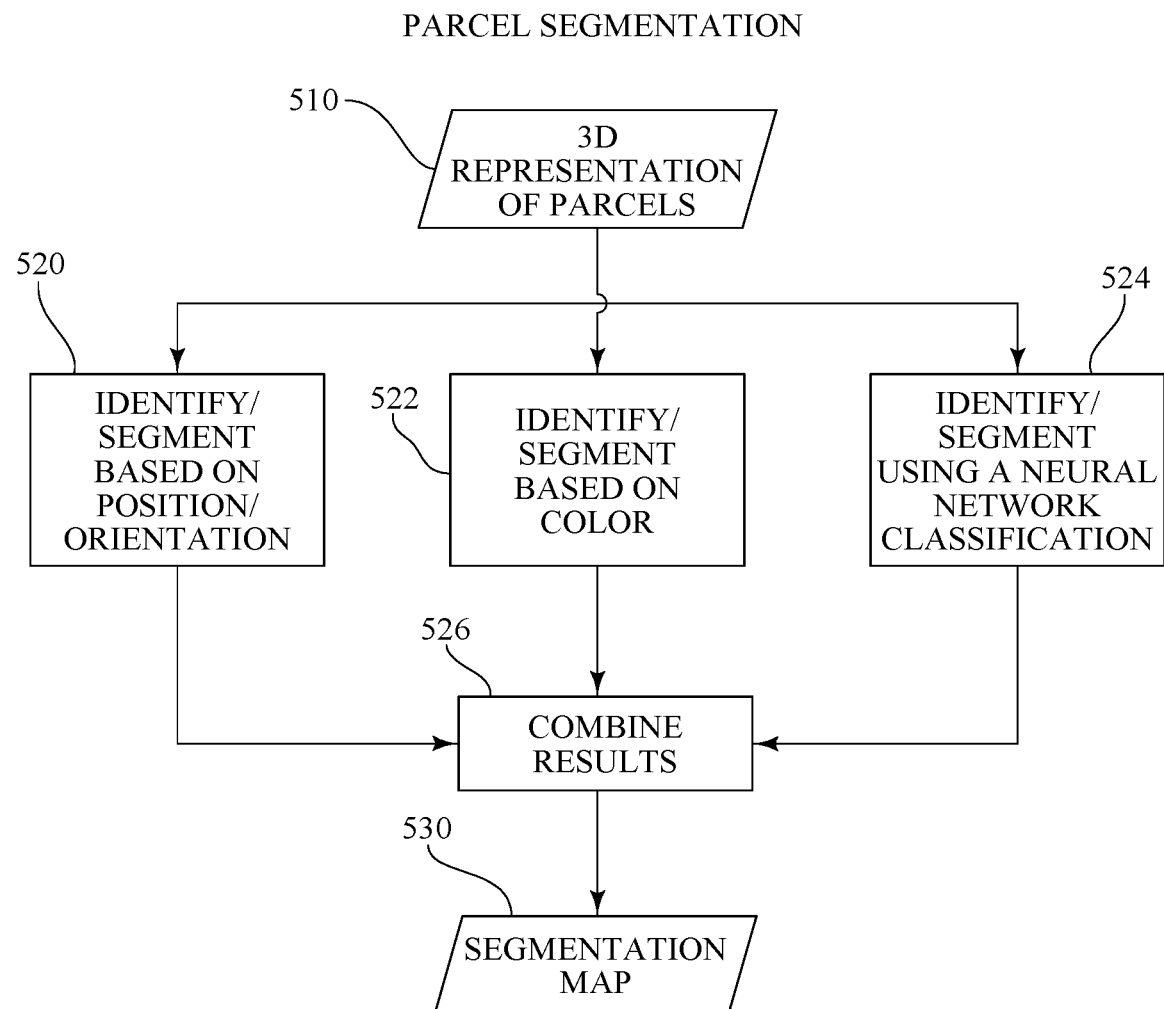
FIG. 9 is an exemplary flow chart for a "Parcel Segmentation" routine according to the system and method of the present invention.

Referring now to FIG. 9, in one exemplary implementation, a "Parcel Segmentation" routine includes multiple separate subroutines for analyzing the three-dimensional representation of the parcels. Specifically, as shown in FIG. 9, in one subroutine, parcels are identified and segmented based on their position and orientation (X, Y, Z coordinates) in the three-dimensional representation, as indicated by block 520 in FIG. 9. In another subroutine, parcels are identified and segmented based on analysis of color in the image data, as indicated by block 522 in FIG. 9. In another subroutine, parcels are identified and segmented using a neural network classification, as indicated by block 524 in FIG. 9. Finally, when multiple subroutines are used to analyze the three-dimensional representation of the parcels, the results are effectively combined, as indicated by output 526 in FIG. 9, to generate a complete segmentation map of the parcels, as indicated by output 530 in FIG. 9.

Figure 10:
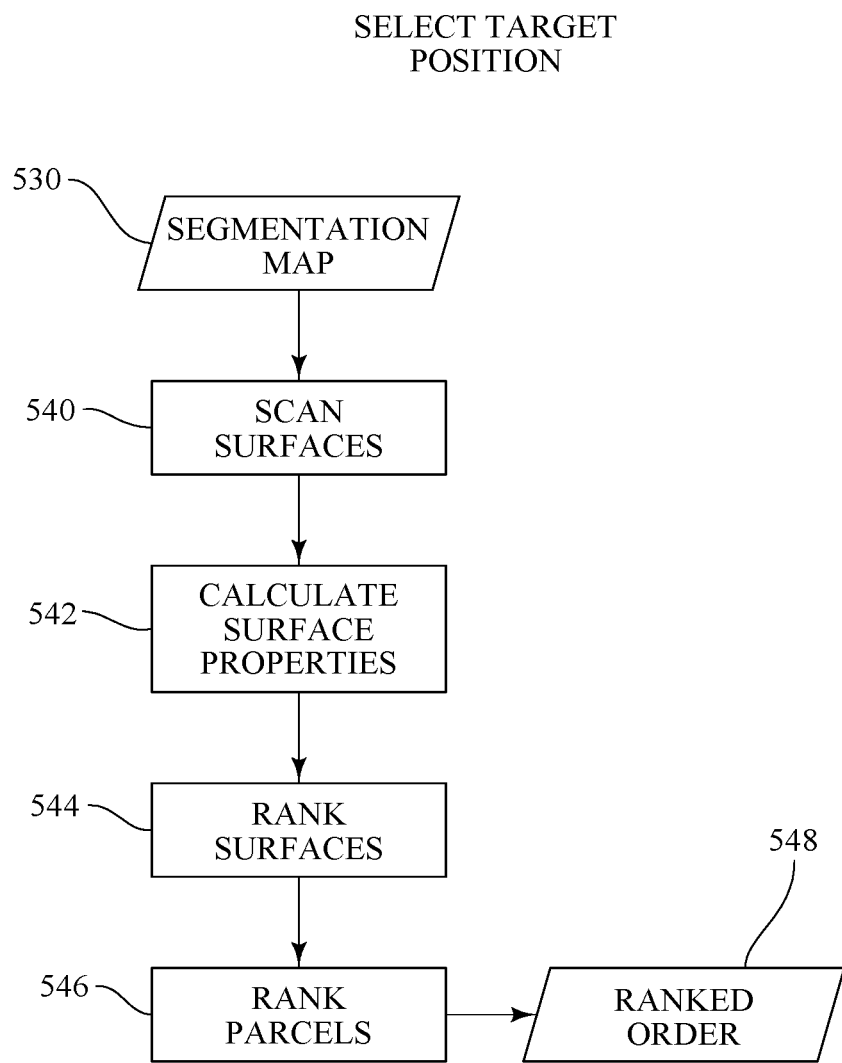
FIG. 10 is an exemplary flow chart for a "Select Target Position" routine according to the system and method of the present invention.

Once a complete segmentation map of the parcels has been generated, the segmentation map is examined to identify parcels and their surface properties, and then to rank parcels for acquisition. Referring now to FIG. 10, in one exemplary implementation of a "Select Target Position" routine, the first step is to scan the surfaces of each parcel, as indicated by block 540 in FIG. 10. The next step is to calculate surface properties, such as the area of one or more exposed surfaces of the parcel, as indicated by block 542 in FIG. 10. The next step is to rank surfaces based on engagement confidence, i.e., whether the robot 40a can effectively engage the surface of the parcel, as indicated by block 544 in FIG. 10. The final step is to rank parcels for targeting based on priority and potential obstructions, as indicated by block 546 in FIG. 10, which generate a ranked order of the parcels for acquisition by the robot 40a, as indicated by output 548 in FIG. 9. For example, in some implementations, a cost function would be applied to generate the ranked order of the parcels for acquisition by the robot 40a, with the objectives being to optimize pick rate and accuracy.

Returning again to FIG. 7, once the above-described routines have been carried out by the computer 410, and the parcels have been identified and ranked, the computer 410 communicates instructions to position the robot 40a such that the end effector 50a can engage and manipulate each parcel according to the ranked order. Specifically, and as shown in FIG. 7, the computer 410 communicates instructions to a motor control system 60a that controls operation of the robot 40a. For example, suitable motor control systems for use in the present invention include: Control-Logix® controllers, which are part of the Allen-Bradley product line manufactured and distributed by Rockwell Automation, Inc. of Milwaukee, Wis.; and PacDrive™ controllers manufactured and distributed by Schneider Electric Automation GmbH and Schneider Electric USA, Inc.

Referring again to FIGS. 5A-5E, after receiving such instructions, the robot 40a then engages the selected parcel 200 and transfers it from the second indexing conveyor 32a to the induction conveyor 120a. Furthermore, as shown in FIGS. 5A-5E, the singulation station 10a also includes discharge chutes 35a, 36a on either side of the second indexing conveyor 32a. If the vision and control subsystem 400 identifies a parcel that exceeds certain size limitations or is otherwise characterized as "unconveyable," the robot 40a can reject that parcel and place it on one of the discharge chutes 35a, 36a for further processing.

Referring again to FIG. 7, in this exemplary embodiment, the vison and control subsystem 400 also controls movement of the unstacking conveyor 20a, the first indexing conveyor 30a, the second indexing conveyor 32a, and the induction conveyor 120a. Specifically, as shown in FIG. 7, the motor control system 60a is thus also operably connected to and communicates with the unstacking conveyor 20a, the first indexing conveyor 30a, the second indexing conveyor 32a, and the induction conveyor 120a. Thus, at least in some embodiments of the present invention, the computer 410 communicates instructions to the motor control system 60a to selectively activate each of the unstacking conveyor 20a, the first indexing conveyor 30a, and the second indexing conveyor 32a in order to advance parcels toward the robot 40a, as further described below. Furthermore, at least in some embodiments of the present invention, the computer 410 communicates instructions to the motor control system 60a to selectively activate the induction conveyor 120a to move singulated parcels away from the robot 40a. Finally, although not shown in FIG. 7, the motor control system 60a may also receive signals from one or more additional sensors for feedback regarding the movement or other operating parameters of the unstacking conveyor 20a, the first indexing conveyor 30a, the second indexing conveyor 32a, and/or the induction conveyor 120a.

Figure 11:
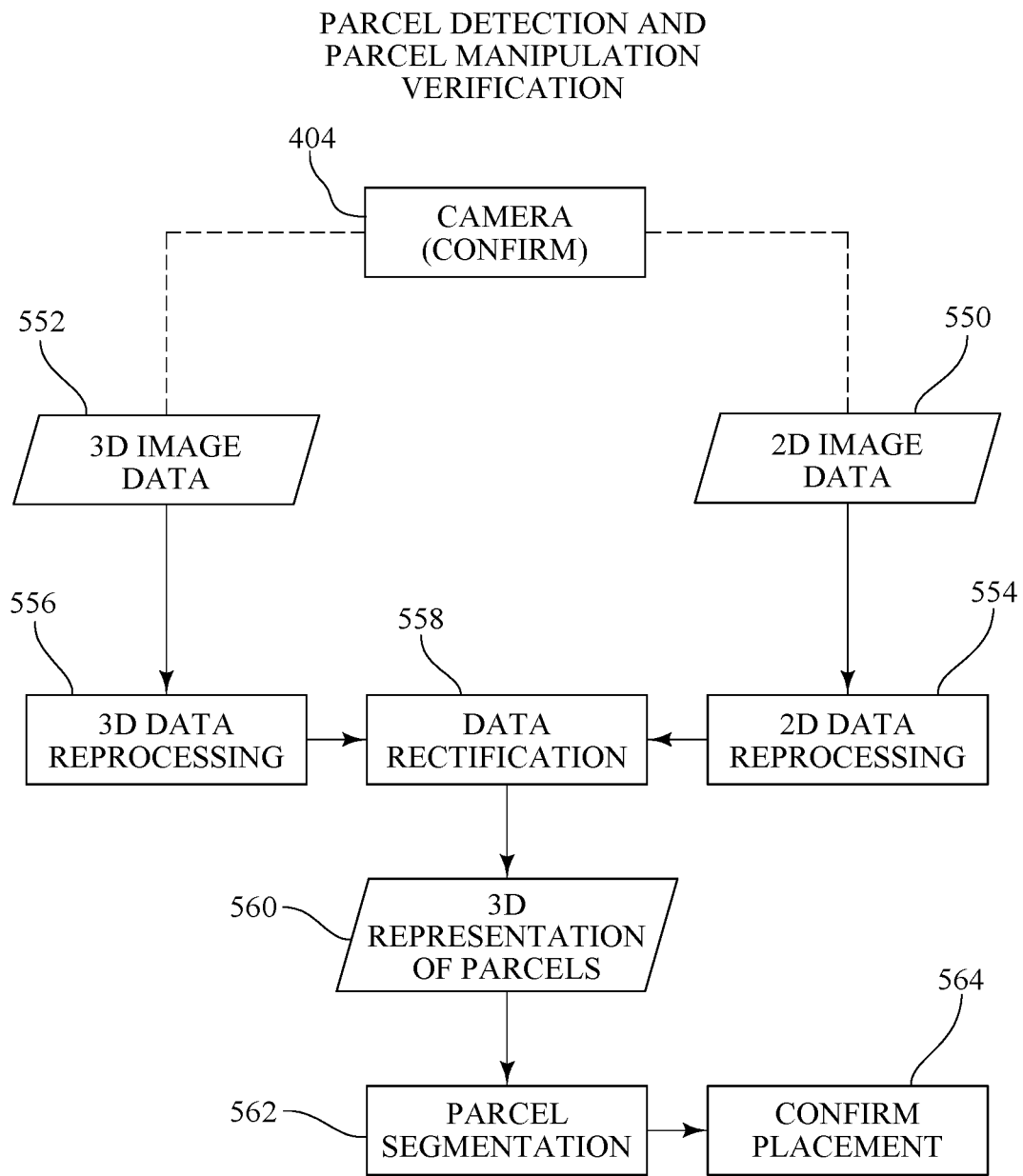
FIG. 11 is an exemplary flow chart for a "Parcel Detection and Parcel Manipulation Verification" routine according to the system and method of the present invention.

Referring now to FIG. 11, a "Parcel Detection and Parcel Manipulation Verification" routine is then employed to confirm accurate placement. Specifically, image data from the second (or Confirm) camera 404 is used to generate a three-dimensional representation of the parcels during and after placement. In this regard, and as shown in FIG. 11, the camera 404 may actually acquire two-dimensional image data of the parcels and three-dimensional image data (e.g., in point-cloud data format) of the parcels, as indicated by inputs 550, 552 in FIG. 11. The two-dimensional image data and the three-dimensional image data are then subjected to a pre-processing in order, if necessary, to correct or modify raw data received from the camera 404, as indicated by blocks 554, 556 in FIG. 11. Additionally, if both two-dimensional data and three-dimensional data sets are acquired by the camera 402, there is an additional step of data rectification, in which the two-dimensional data and three-dimensional data sets are indexed or transformed to a common coordinate system, as indicated by block 558 in FIG. 11. The final result is a three-dimensional representation of the parcels, as indicated by output 560 in FIG. 11.

Referring still to FIG. 11, parcels are then identified and segmented from the three-dimensional representation, as indicated by block 562 in FIG. 11. It is contemplated that this is accomplished in the same manner that parcels are identified and segmented prior to engagement by the robot 40a, as described above, for example, with respect to FIG. 9. Of course, after placement, the parcels are singulated and in a line on the induction conveyor 120a (as shown, for example, in FIG. 5E), and so, each parcel is separate and apart from the other parcels. Finally, once a parcel has been identified, its position on the induction conveyor 120 can be compared to the target position for placement of the parcel to confirm proper placement, as indicated by block 564 in FIG. 9.

Again the computer 410 includes a processor 412 for executing instructions stored in a memory component 414 or other computer-readable medium for carrying out the operational and computational steps of the above-described routines and/or subroutines that are illustrated in FIGS. 8-11. Such instructions can be coded into a computer-readable form using standard programming techniques and languages, and, with benefit of the above description, such programming is readily accomplished by a person of ordinary skill in the art.

With respect to the control of the movement of the unstacking conveyor 20a, the first indexing conveyor 30a, and the second indexing conveyor 32a, reference is now made to FIGS. 12A-M, which are schematic views that illustrate movement of the parcels along these conveyors 20a, 30a, 32a.

As shown in FIG. 12A, parcels are being conveyed on the bulk flow splitting conveyor 110.

As shown in FIG. 12B, and as described above with reference to FIGS. 2A-I, as a result of the activation of a series of powered rollers or other known bulk splitting techniques, a volume of parcels is moved off of the bulk flow splitting conveyor 110 and delivered to the first singulation station (or lane) 10a.

Figure 12D:
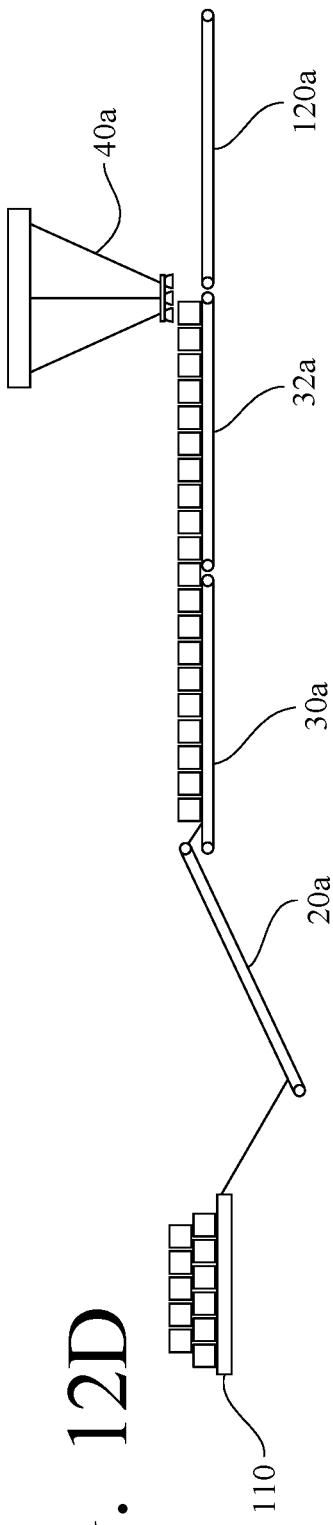

As shown in FIGS. 12B and 12C, and as described above with respect to FIGS. 3 and 4, as parcels are moved off of the bulk flow splitting conveyor 110, they slide onto the unstacking conveyor 20a, which has an upward incline, such that the force of gravity causes parcels to unstack as they are delivered to the first indexing conveyor 30a. The parcels are then delivered to the second indexing conveyor 32a. During this conveyance of parcels in FIGS. 12A-C, each of the unstacking conveyor 20a, the first indexing conveyor 30a, and the second indexing conveyor 32a is activated and is moving the parcels forward toward the robot 40a, until there are no more parcels remaining on the unstacking conveyor 20a, as shown in FIG. 12D. Furthermore, during this conveyance of parcels in FIGS. 12A-C, the movement of the unstacking conveyor 20a, the first indexing conveyor 30a, and the second indexing conveyor 32a is preferably synchronized.

Referring still to FIG. 12D, once a volume of parcels has been positioned near the robot 40a, the robot 40a receives instructions from the vison and control subsystem 400 to engage and move each parcel to the induction conveyor 120a, as described above with respect to FIG. 7 and FIGS. 8-11. As also described above with respect to FIG. 7 and FIGS. 8-11, the vison and control subsystem 400 also communicates instructions to selectively activate the first indexing conveyor 30a and the second indexing conveyor 32a as necessary to advance parcels toward the robot 40a.

Figure 12E:
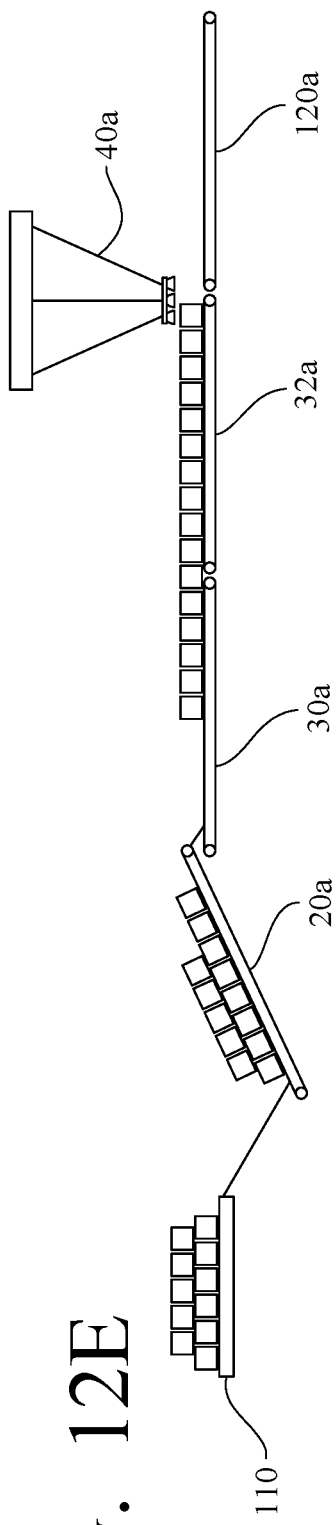

As shown in FIG. 12E, once a certain volume of parcels have been moved from the second indexing conveyor 32a to the induction conveyor 120a, another volume of parcels is moved off of the bulk flow splitting conveyor 110 and delivered to the unstacking conveyor 20a. At this time, movement of the unstacking conveyor 20a is suspended.

Figure 12F:
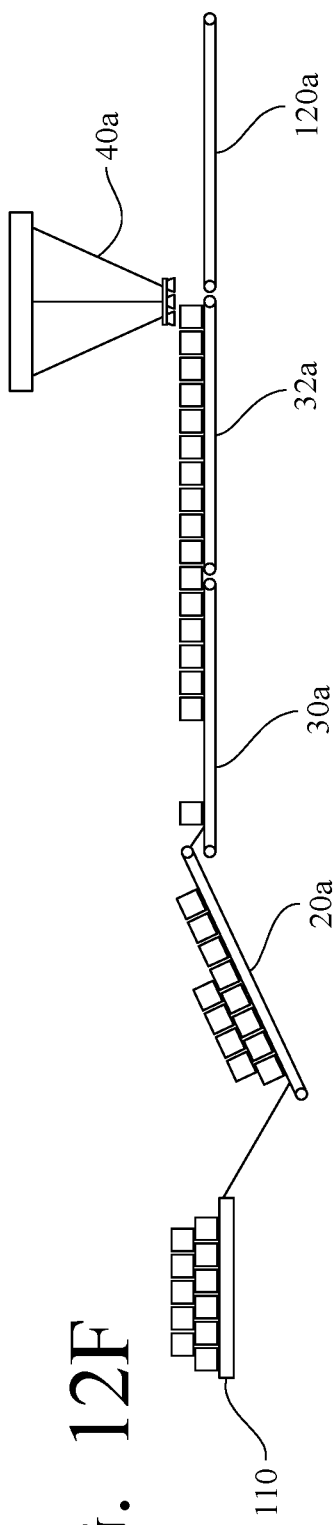
Figure 12G:
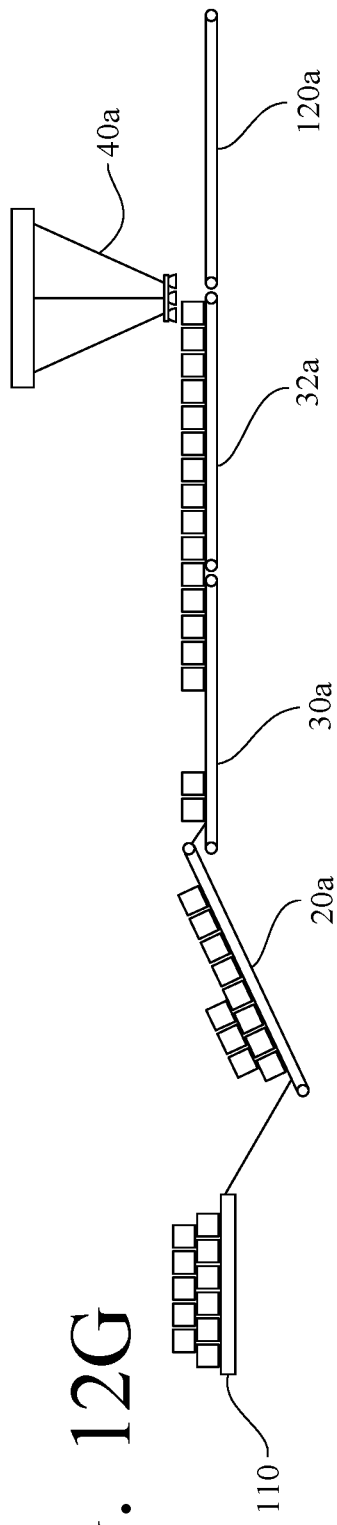
Figure 12H:
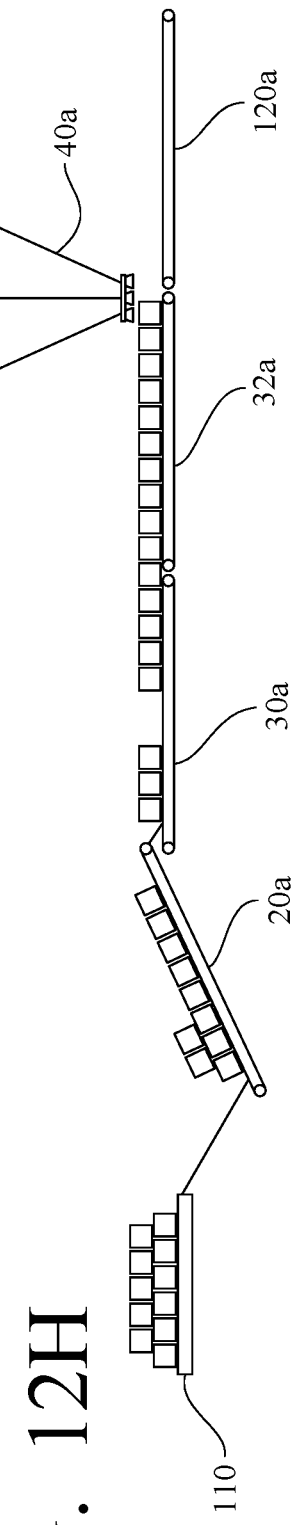
Figure 12I:
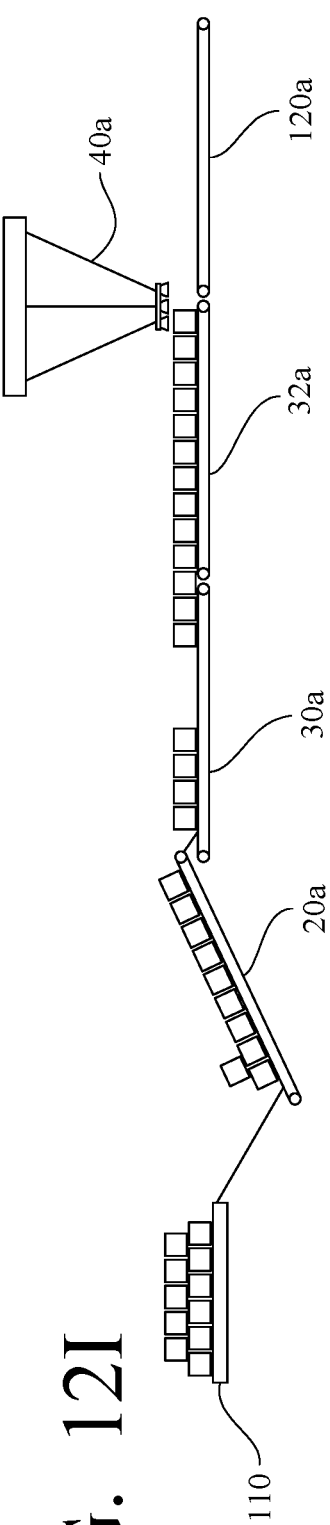
Figure 12J:
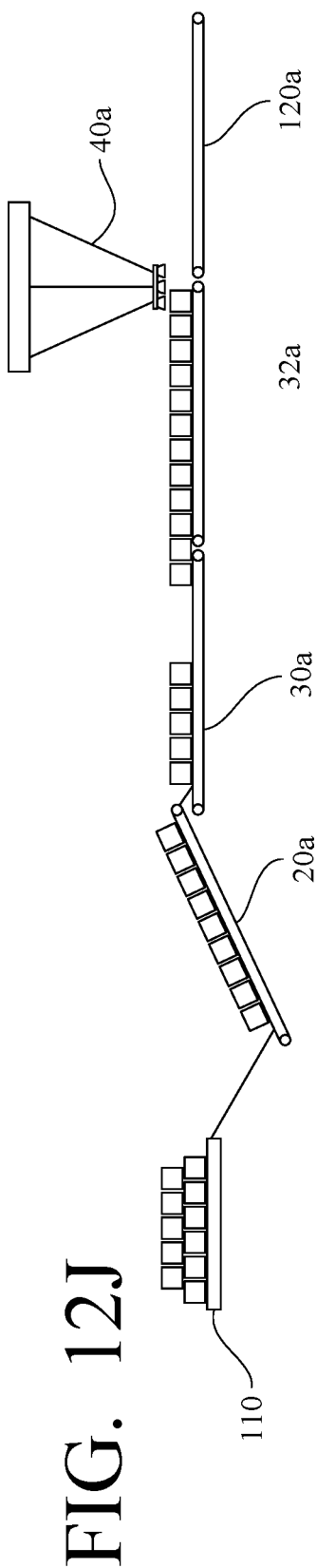
Figure 12K:
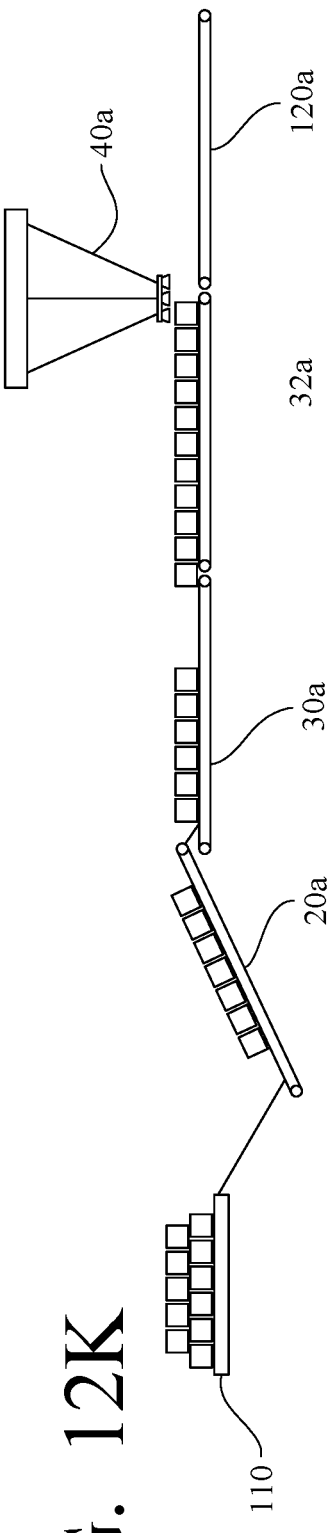
Figure 12L:
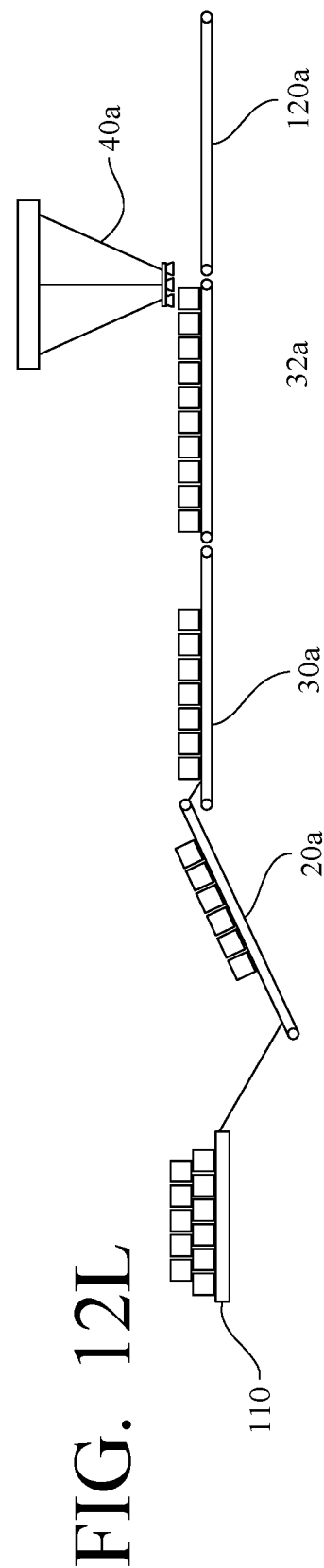
Figure 12M:
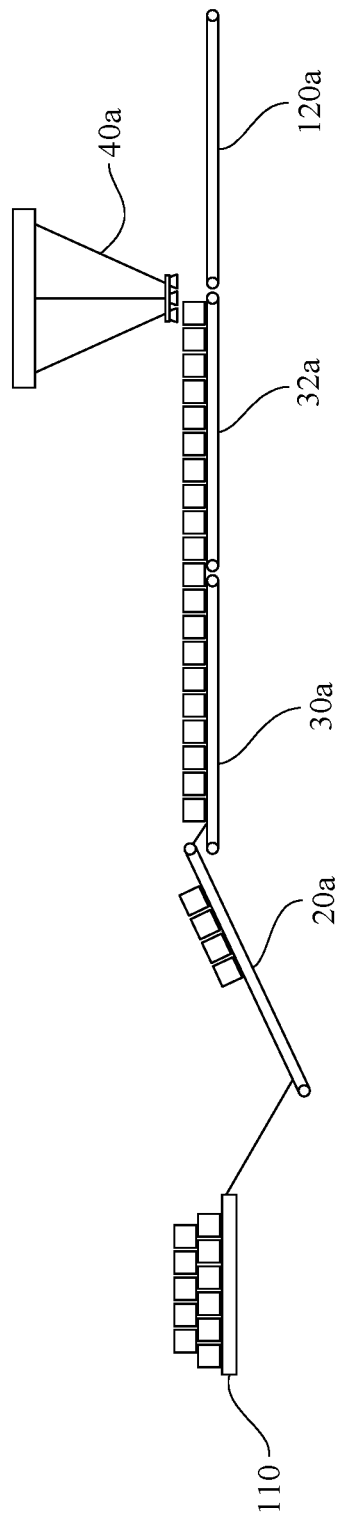

As shown in FIGS. 12F and 12G, the unstacking conveyor 20a is then activated to deliver parcels to the first indexing conveyor 30a. As shown, a small gap in the flow may be created as the robot 40a continues to engage and move parcels from the second indexing conveyor 32a before the unstacking conveyor 20a begins to deliver the new parcels to the first indexing conveyor 30a.

As shown in FIGS. 12H-M, the small gap can eventually be eliminated as the parcels transition from the first indexing conveyor 30a to the second indexing conveyor 32a. Specifically, movement of the second indexing conveyor 32a can be suspended while the first indexing conveyor 30a and the unstacking conveyor 20a continue to advance parcels toward the robot 40a.

The process illustrated in FIGS. 12A-M then essentially repeats.

Referring again to FIGS. 1 and 3, and as mentioned above, the robot singulator 40a places each parcel onto the induction conveyor 120a for delivery to the sorter 130. Furthermore, and as also mentioned above, the bulk flow splitting conveyor 110 divides and delivers parcels to four separate and substantially identical singulation stations (or lanes) 10a, 10b, 10c, 10d. Each of the other singulation stations 10b, 10c, 10d is substantially identical to the singulation station 10a described above. Thus, in the exemplary configuration illustrated in FIG. 1, there are actually four complete assemblies of: an unstacking conveyor; a first indexing conveyor; a second indexing conveyor; and a robot singulator.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for identifying and transferring parcels, comprising:
   a first conveyor carrying a bulk flow of multiple parcels;
   an indexing conveyor that receives the bulk flow of multiple parcels and is selectively activated and deactivated to advance the bulk flow of multiple parcels, while creating gaps between parcels in the bulk flow;
   a robot singulator configured to engage and transfer individual parcels in the bulk flow of multiple parcels to a second conveyor; and
   a vision and control subsystem, including
      a first camera for acquiring image data of the bulk flow of multiple parcels, and
      a computer including a processor for executing instructions stored in a memory component to (i) receive and process the image data from the first camera to identify and segment individual parcels in the bulk flow of multiple parcels, (ii) communicate instructions to the robot singulator to engage and transfer one or more of the individual parcels to the second conveyor, and (iii) communicate instructions which cause the indexing conveyor to selectively advance the bulk flow of multiple parcels towards the robot singulator.

2. The system as recited in claim 1, wherein the robot singulator includes an end effector with a means for engaging a parcel mounted on a framework, which is controlled to move and position the end effector.

3. The system as recited in claim 1, wherein the vision and control subsystem includes a second camera for acquiring image data of the individual parcels after placement on the second conveyor, and wherein the computer also executes instructions to (iv) receive and process the image data from the second camera to confirm placement of each individual parcel on the second conveyor.

4. A system for identifying and transferring parcels, comprising:
   a first conveyor carrying a bulk flow of multiple parcels;
   an unstacking conveyor, which receives the bulk flow of multiple parcels from the first conveyor, wherein the unstacking conveyor has an upward incline, such that gravitational force causes certain parcels in the bulk flow of multiple parcels to unstack;
   a receiving area at a distal end of the unstacking conveyor for receiving parcels from the bulk flow of multiple parcels;
   a robot singulator configured to engage and transfer individual parcels in the receiving area to a second conveyor; and
   a vision and control subsystem, including
      a first camera for acquiring image data of the bulk flow of multiple parcels, and
      a computer including a processor for executing instructions stored in a memory component to (i) receive and process the image data from the first camera to identify and segment individual parcels in the bulk flow of multiple parcels, (ii) communicate instructions to the robot singulator to engage and transfer one or more of the individual parcels to the second conveyor, and (iii) communicate instructions to selectively activate and deactivate the unstacking conveyor.

5. The system as recited in claim 4, wherein the robot singulator includes an end effector with a means for engaging a parcel mounted on a framework, which is controlled to move and position the end effector.

6. The system as recited in claim 4, wherein the vision and control subsystem includes a second camera for acquiring image data of the individual parcels after placement on the second conveyor, and wherein the computer also executes instructions to (iv) receive and process the image data from the second camera to confirm placement of each individual parcel on the second conveyor.

7. A system for identifying and transferring parcels, comprising:
- a bulk flow conveyor carrying a bulk flow of parcels; and
- multiple singulation stations, each of the multiple singulation stations receiving a volume of parcels from the bulk flow conveyor, and each of the multiple singulation stations including
  - an induction conveyor,
  - an indexing conveyor positioned downstream of the bulk flow conveyor that receives the volume of parcels and is selectively activated and deactivated to advance the volume of parcels, while creating gaps between parcels,
  - a robot singulator configured to engage and transfer each parcel in the volume of parcels to the induction conveyor, and
  - a vision and control subsystem, including (a) a first camera for acquiring image data of the volume of parcels, and (b) a computer including a processor for executing instructions stored in a memory component to (i) receive and process the image data from the first camera to identify individual parcels, (ii) communicate instructions to the robot singulator to engage and transfer one or more of the individual parcels to the induction conveyor, and (iii) communicate instructions which cause the indexing conveyor to selectively advance the volume of parcels toward the robot singulator.

8. The system as recited in claim 7, and further comprising a sorter configured to receive parcels from the induction conveyor of each of the multiple singulation stations.

9. The system as recited in claim 7, wherein the robot singulator in each of the multiple singulation stations includes an end effector with a means for engaging a parcel mounted on a framework, which is controlled to move and position the end effector.

10. The system as recited in claim 7, wherein the vision and control subsystem in each of the multiple singulation stations includes a second camera for acquiring image data of the individual parcels after placement on the induction conveyor, and wherein the computer also executes instructions to (iv) receive and process the image data from the second camera to confirm placement of each individual parcel on the induction conveyor.

11. A system for identifying and transferring parcels, comprising:
- a bulk flow conveyor carrying a bulk flow of parcels; and
- multiple singulation stations, each of the multiple singulation stations receiving a volume of parcels from the bulk flow conveyor, and each of the multiple singulation stations including
  - an induction conveyor,
  - an unstacking conveyor, which receives the volume of parcels from the bulk flow conveyor, wherein the unstacking conveyor has an upward incline, such that gravitational force causes certain parcels in the volume of parcels to unstack,
  - a receiving area at a distal end of the unstacking conveyor for receiving parcels from the volume of parcels,
  - a robot singulator configured to engage and transfer individual parcels in the volume of parcels to the induction conveyor, and
  - a vision and control subsystem, including (a) a first camera for acquiring image data of the volume of parcels, and (b) a computer including a processor for executing instructions stored in a memory component to (i) receive and process the image data from the first camera to identify individual parcels in the volume of parcels, (ii) communicate instructions to the robot singulator to engage and transfer one or more of the individual parcels to the induction conveyor, and (iii) communicate instructions to selectively activate and deactivate the unstacking conveyor.

12. The system as recited in claim 11, and further comprising a sorter configured to receive parcels from the induction conveyor of each of the multiple singulation stations.

13. The system as recited in claim 11, wherein the robot singulator in each of the multiple singulation stations includes an end effector with a means for engaging a parcel mounted on a framework, which is controlled to move and position the end effector.

14. The system as recited in claim 11, wherein the vision and control subsystem in each of the multiple singulation stations includes a second camera for acquiring image data of the individual parcels after placement on the induction conveyor, and wherein the computer also executes instructions to (iv) receive and process the image data from the second camera to confirm placement of each individual parcel on the induction conveyor.

15. A system for identifying and transferring parcels, comprising:
- a first conveyor carrying a bulk flow of multiple parcels;
- at least one of (a) an indexing conveyor positioned downstream of the first conveyor that receives the bulk flow of multiple parcels and is selectively activated and deactivated to advance the bulk flow of multiple parcels, while creating gaps between parcels in the bulk flow and (b) an unstacking conveyor, which receives the bulk flow of multiple parcels from the first conveyor, wherein the unstacking conveyor has an upward incline;
- a robot singulator configured to engage and transfer individual parcels in the bulk flow of multiple parcels to a second conveyor; and
- a vision and control subsystem, including
  - a first camera for acquiring image data of the bulk flow of multiple parcels,
  - a computer including a processor for executing instructions stored in a memory component to (i) receive and process the image data from the first camera to identify and segment individual parcels in the bulk flow of multiple parcels and (ii) communicate instructions to the robot singulator to engage and transfer one or more of the individual parcels to the second conveyor, and
  - a second camera for acquiring image data of the individual parcels after placement on the second conveyor by the robot singulator, and wherein the computer also executes instructions to (iii) receive and process the image data from the second camera to confirm placement of each individual parcel on the second conveyor.

16. The system for identifying and transferring parcels as recited in claim 7, wherein each singulation station further includes a means for moving the volume of parcels off of the bulk flow conveyor.

17. The system for identifying and transferring parcels as recited in claim 16, wherein the means for moving the volume of parcels is a series of powered rollers that are selectively activated to move parcels off of the bulk flow conveyor.

\* \* \* \* \*